(12) United States Patent
Akkarakaran et al.

(10) Patent No.: US 10,154,481 B2
(45) Date of Patent: Dec. 11, 2018

(54) OPTIMIZATION OF SEARCH SPACE AND SOUNDING REFERENCE SIGNAL PLACEMENT FOR IMPROVED DECODING TIMELINE

(71) Applicant: QUALCOMM Incorporated, San Diego, CA (US)

(72) Inventors: Sony Akkarakaran, Poway, CA (US); Tao Luo, San Diego, CA (US); Wanshi Chen, San Diego, CA (US); Hao Xu, Beijing (CN); Peter Gaal, San Diego, CA (US); Yi Huang, San Diego, CA (US); Renqiu Wang, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/812,994

(22) Filed: Nov. 14, 2017

(65) Prior Publication Data

US 2018/0139735 A1 May 17, 2018

Related U.S. Application Data

(60) Provisional application No. 62/422,180, filed on Nov. 15, 2016.

(51) Int. Cl.
*H04J 3/00* (2006.01)
*H04W 72/04* (2009.01)
(Continued)

(52) U.S. Cl.
CPC ........... *H04W 72/042* (2013.01); *H04L 5/005* (2013.01); *H04L 5/0048* (2013.01); *H04L 5/14* (2013.01);
(Continued)

(58) Field of Classification Search
None
See application file for complete search history.

(56) References Cited

U.S. PATENT DOCUMENTS

| | | | |
|---|---|---|---|
| 2012/0087299 A1* | 4/2012 | Bhattad | H04L 5/0051 370/315 |
| 2012/0163437 A1 | 6/2012 | Frederiksen et al. | |

(Continued)

OTHER PUBLICATIONS

CATT: "Design Principles of DCI Formats", R1-1611392, 3GPP TSG RAN WG1 Meeting #87, 7.1.4.1, Reno, USA, Nov. 14-18, 2016, pp. 1-4.

(Continued)

*Primary Examiner* — Bob A Phunkulh
(74) *Attorney, Agent, or Firm* — Qualcomm IP Dept.; James Hunt Yancey, Jr.

(57) ABSTRACT

Aspects of the disclosure relate to wireless communication systems configured to provide techniques for strategically placing a sounding reference signal (SRS) within a slot to improve the decoding timeline. Aspects of the disclosure further relate to wireless communication systems configured to optimize the physical downlink control channel (PDCCH) search space within a slot to improve the decoding timeline. Features may also include placing the SRS near the end of the slot, such as after the uplink user data traffic and the corresponding uplink demodulation reference signal (DMRS). In addition, features may also include identifying the PDCCH search space within the slot based on at least a slot index of the slot. Other aspects, embodiments, and features are also claimed and described.

30 Claims, 18 Drawing Sheets

(51) Int. Cl.
H04L 5/00 (2006.01)
H04L 5/14 (2006.01)
H04B 7/212 (2006.01)

(52) U.S. Cl.
CPC ............ *H04B 7/212* (2013.01); *H04L 5/0051* (2013.01); *H04W 72/0446* (2013.01)

(56) References Cited

U.S. PATENT DOCUMENTS

| | | | | |
|---|---|---|---|---|
| 2012/0320859 | A1* | 12/2012 | Ahn | H04L 1/1607 370/329 |
| 2013/0028134 | A1* | 1/2013 | Wang | H04L 5/0048 370/254 |
| 2013/0028241 | A1* | 1/2013 | Wang | H04L 25/0228 370/336 |
| 2013/0202015 | A1* | 8/2013 | Frank | H04B 7/0632 375/219 |
| 2013/0343239 | A1* | 12/2013 | Damnjanovic | H04L 5/001 370/280 |
| 2014/0119317 | A1* | 5/2014 | Kim | H04L 5/0048 370/329 |
| 2014/0293942 | A1* | 10/2014 | Kang | H04L 5/0053 370/329 |
| 2014/0293957 | A1* | 10/2014 | Chun | H04L 5/0041 370/330 |
| 2015/0131566 | A1* | 5/2015 | Seo | H04B 1/3838 370/329 |
| 2015/0257184 | A1* | 9/2015 | Yamazaki | H04W 76/14 370/329 |
| 2016/0135147 | A1* | 5/2016 | Ouchi | H04W 52/146 370/329 |
| 2016/0165547 | A1* | 6/2016 | Ouchi | H04W 52/146 455/522 |
| 2016/0344461 | A1* | 11/2016 | Frank | H04B 7/0478 |
| 2017/0264395 | A1* | 9/2017 | Wakabayashi | H04L 1/08 |
| 2017/0290008 | A1* | 10/2017 | Tooher | H04W 72/0446 |
| 2017/0310427 | A1* | 10/2017 | Wakabayashi | H04L 1/1825 |
| 2017/0324457 | A9* | 11/2017 | Frank | H04B 7/0478 |
| 2017/0374675 | A1* | 12/2017 | Hwang | H04W 72/1268 |

OTHER PUBLICATIONS

CATT: "Initial Views on DL Control Search Space", R1-1611393, 3GPP TSG RAN WG1 Meeting #87, 7.1.4.1, Reno, USA, Nov. 14-18, 2016, pp. 1-3.
Huawei: "Discussion on Search Space Design for DL Control Channels", R1-1611211, 3GPP TSG RAN WG1 Meeting #87, 7.1.4.1, Reno, USA, Nov. 14-18, 2016, pp. 1-3.
ZTE: "NR Downlink DCI Design and Procedure", R1-1611293, 3GPP TSG RAN WG1 Meeting #87, 7.1.4.3, Reno, USA, Nov. 14-18, 2016, pp. 1-4.
CATT., "NR DL Control Channel Design Considerations," 3GPP Draft, R1-1608791, 3RD Generation Partnership Project (3GPP), Mobile Competence Centre, 650, Route Des Lucioles, F-06921, Sophia-Antipolis Cedex, vol. RAN WG1, No. Lisbon, Portugal, Oct. 9, 2016, XP051148846, pp. 1-5.
Huawei et al., "Summary on [84-14] PUSCH Frame Structure in eLAA," 3GPP Draft, R1-162728, 3RD Generation Partnership Project (3GPP), Mobile Competence Centre, 650, Route Des Lucioles, F-06921 Sophia-Antipolis Cedex, France, vol. RAN WG1, No. Susan, Korea, Apr. 2, 2016, XP051080357, 5 Pages.
International Search Report and Written Opinion—PCT/US2017/061856—ISA/EPO—dated Apr. 19, 2018.
Mediatek Inc., "DL Control Channel Design for NR," 3GPP Draft, R1-1612120, 3RD Generation Partnership Project (3GPP), Mobile Competence Centre, 658, Route Des Lucioles, F-86921, Sophia-Antipolis Cedex, France, vol. RAN WG1, No. Reno, USA, Nov. 13, 2016, XP051176075, pp. 1-4.
Nokia Networks., et al., "On LAA SRS," 3GPP Draft, R1-160913, LAA SRS—Final, 3RD Generation Partnership Project, Mobile Competence Centre, 650, Route Des Lucioles, F-06921 Sophia-Antipolis Cedex, France, vol. RAN WG1, No. St. Julian's, Malta, Feb. 14, 2016 (Feb. 14, 2016), XP051054237, 5 Pages.
Qualcomm Incorporated, "DL Control Channels Overview," 3GPP Draft, R1-1610177, 3RD Generation Partnership Project (3GPP), Mobile Competence Centre, 658, Route Des Lucioles, F-86921 Sophia-Antipolis Cedex, France, vol. RAN WG1, No. Lisbon, Portugal, Oct. 9, 2016, XP051150197, pp. 1-6.
Qualcomm Incorporated., "Control Channel for Slot Format Indicator," 3GPP Draft, R1-1612062, PSFICH, 3RD Generation Partnership Project (3GPP), Mobile Competence Centre, 658, Route Des Lucioles, F-86921 Sophia-Antipolis Cedex, France, vol. RAN WG1, No. Reno, Nevada, USA, Nov. 13, 2016, XP051176022, pp. 1-2.
Qualcomm Incorporated., "Remaining Details on SRS," 3GPP Draft, R1-1716408, 3RD Generation Partnership Project (3GPP), Mobile Competence Centre, 650, Route Des Lucioles, F-06921, Sophia-Antipolis Cedex, France, vol. RAN WG1, No. 3, Nagoya, Japan, Sep. 12, 2017, XP051329997, pp. 1-7.
Samsung., "Discussion on SRS for UL LAA," 3GPP Draft, R1-162665, 3RD Generation Partnership Project (3GPP), Mobile Competence Centre, 650, Route Des Lucioles, F-06921, Sophia-Antipolis Cedex, France, vol. RAN WG1, No. Susan, Korea, Apr. 2, 2016, XP051080332, pp. 1-4.

* cited by examiner

OPTIMIZATION OF SEARCH SPACE AND SOUNDING REFERENCE SIGNAL PLACEMENT FOR IMPROVED DECODING TIMELINE

PRIORITY CLAIM

This application claims priority to and the benefit of Provisional Patent Application No. 62/422,180 filed in the U.S. Patent and Trademark Office on Nov. 15, 2016, the entire content of which is incorporated herein by reference as if fully set forth below in its entirety and for all applicable purposes.

TECHNICAL FIELD

The technology discussed below relates generally to wireless communication systems, and more particularly, to optimization of the search space for the Physical Downlink Control Channel (PDCCH) and the placement of the sounding reference signal within a slot in wireless communication systems.

INTRODUCTION

In a fourth-generation (4G) wireless communication network that follows standards for an evolved UMTS Terrestrial Radio Access Network (eUTRAN, also commonly known as LTE), over-the-air transmissions of information are assigned to various physical channels or signals. Very generally, these physical channels or signals carry user data traffic and control information. For example, a Physical Downlink Shared Channel (PDSCH) is the main user data traffic bearing downlink channel, while the Physical Uplink Shared Channel (PUSCH) is the main user data traffic bearing uplink channel. A Physical Downlink Control Channel (PDCCH) carries downlink control information (DCI) providing downlink assignments and/or uplink grants of time-frequency resources to a user equipment (UE) or a group of UEs. A Physical Uplink Control Channel (PUCCH) carries uplink control information including acknowledgement information, channel quality information, scheduling requests, and multiple-input-multiple-output (MIMO) feedback information.

In addition, various uplink and downlink signals may be used to aid in channel estimation and coherent demodulation. Examples of such signals include downlink reference signals, demodulation reference signals and sounding reference signals. In many existing systems, these channels and signals are time-divided into frames, and the frames are further subdivided into subframes, slots, and symbols.

In general, subframes or slots may follow a pattern where the control information is time division multiplexed (TDM) with the data information, with the control information being transmitted at the beginning and/or end of a subframe or slot. Next generation (e.g., 5G or New Radio) wireless communication networks may provide lower overhead for control information, lower latency, shorter symbol durations, and higher peak data rates, while still demanding higher reliability. Efficient techniques for improving the decoding timeline within a cell may enable wireless communication networks to meet one or more of these stringent requirements.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the present disclosure provide techniques for strategically placing a sounding reference signal (SRS) within a slot to improve the decoding timeline. Aspects of the disclosure further provide techniques for optimizing the physical downlink control channel (PDCCH) search space within a slot to improve the decoding timeline.

In one aspect of the disclosure, a method of wireless communication is provided in a cell utilizing a time division duplex (TDD) carrier, where the TDD carrier includes a plurality of slots. The method includes receiving downlink control information in a downlink control region of a slot of the plurality of slots, transmitting uplink information including at least one of uplink control information or uplink user data traffic corresponding to the downlink control information in an uplink region of the slot, and transmitting a sounding reference signal in the uplink region of the slot. In the method, the sounding reference signal is transmitted prior to transmitting the uplink information or after transmitting the uplink information.

Another aspect of the disclosure provides a scheduled entity within a wireless communication network. The scheduled entity includes a transceiver, a memory, and a processor communicatively coupled to the transceiver and the memory. The processor can be configured as a processor circuit or circuitry capable of executing sets of instructions and comprising internal hardware enabling said execution. The processor is configured to receive downlink control information in a downlink control region of a slot of a plurality of slots of a time division duplex (TDD) carrier. The processor is further configured to transmit uplink information including at least one of uplink control information or uplink user data traffic corresponding to the downlink control information in an uplink region of the slot, and transmit a sounding reference signal in the uplink region of the slot. The sounding reference signal is transmitted prior to transmitting the uplink information or after transmitting both the uplink information.

Another aspect of the disclosure provides a scheduled entity apparatus within a wireless communication network. The scheduled entity apparatus includes means for receiving downlink control information in a downlink control region of a slot of the plurality of slots, means for transmitting uplink information including at least one of uplink control information or uplink user data traffic corresponding to the downlink control information in an uplink region of the slot, and means for transmitting a sounding reference signal in the uplink region of the slot. The sounding reference signal is transmitted prior to transmitting the uplink information or after transmitting the uplink information.

Another aspect of the disclosure provides a method of wireless communication in a cell utilizing a time division duplex (TDD) carrier, where the TDD carrier includes a plurality of slots. The method includes receiving a slot of the plurality of slots, where the slot includes a physical downlink control channel (PDCCH), and the PDCCH includes downlink control information (DCI) for a set of one or more scheduled entities. The method further includes identifying a search space including a set of resource elements within the slot based on slot information related to the slot, where the slot information indicates at least one attribute of the slot, and the at least one attribute of the slot includes at least one of a slot type of the slot, a number of scheduled entities scheduled in the slot, or a slot index of the slot. The method further includes blind decoding a plurality of decoding candidates within the set of resource elements to determine whether at least one valid DCI exists for a scheduled entity of the set of one or more scheduled entities.

Another aspect of the disclosure provides a scheduled entity within a wireless communication network. The scheduled entity includes a transceiver, a memory, and a processor communicatively coupled to the transceiver and the memory. The processor can be configured as a processor circuit or circuitry capable of executing sets of instructions and comprising internal hardware enabling said execution. The processor is configured to receive a slot of the plurality of slots, where the slot includes a physical downlink control channel (PDCCH), and the PDCCH includes downlink control information (DCI) for a set of one or more scheduled entities. The processor is further configured to identify a search space including a set of resource elements within the slot based on slot information related to the slot, where the slot information indicates at least one attribute of the slot, and the at least one attribute of the slot includes at least one of a slot type of the slot, a number of scheduled entities scheduled in the slot, or a slot index of the slot. The processor is further configured to blind decode a plurality of decoding candidates within the set of resource elements to determine whether at least one valid DCI exists for a scheduled entity of the set of one or more scheduled entities.

Another aspect of the disclosure provides a scheduled entity apparatus within a wireless communication network. The scheduled entity apparatus includes means for receiving a slot of the plurality of slots, where the slot includes a physical downlink control channel (PDCCH), and the PDCCH includes downlink control information (DCI) for a set of one or more scheduled entities. The scheduled entity apparatus further includes means for identifying a search space including a set of resource elements within the slot based on slot information related to the slot, where the slot information indicates at least one attribute of the slot, and the at least one attribute of the slot includes at least one of a slot type of the slot, a number of scheduled entities scheduled in the slot, or a slot index of the slot. The scheduled entity apparatus further includes means for blind decoding a plurality of decoding candidates within the set of resource elements to determine whether at least one valid DCI exists for a scheduled entity of the set of one or more scheduled entities.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
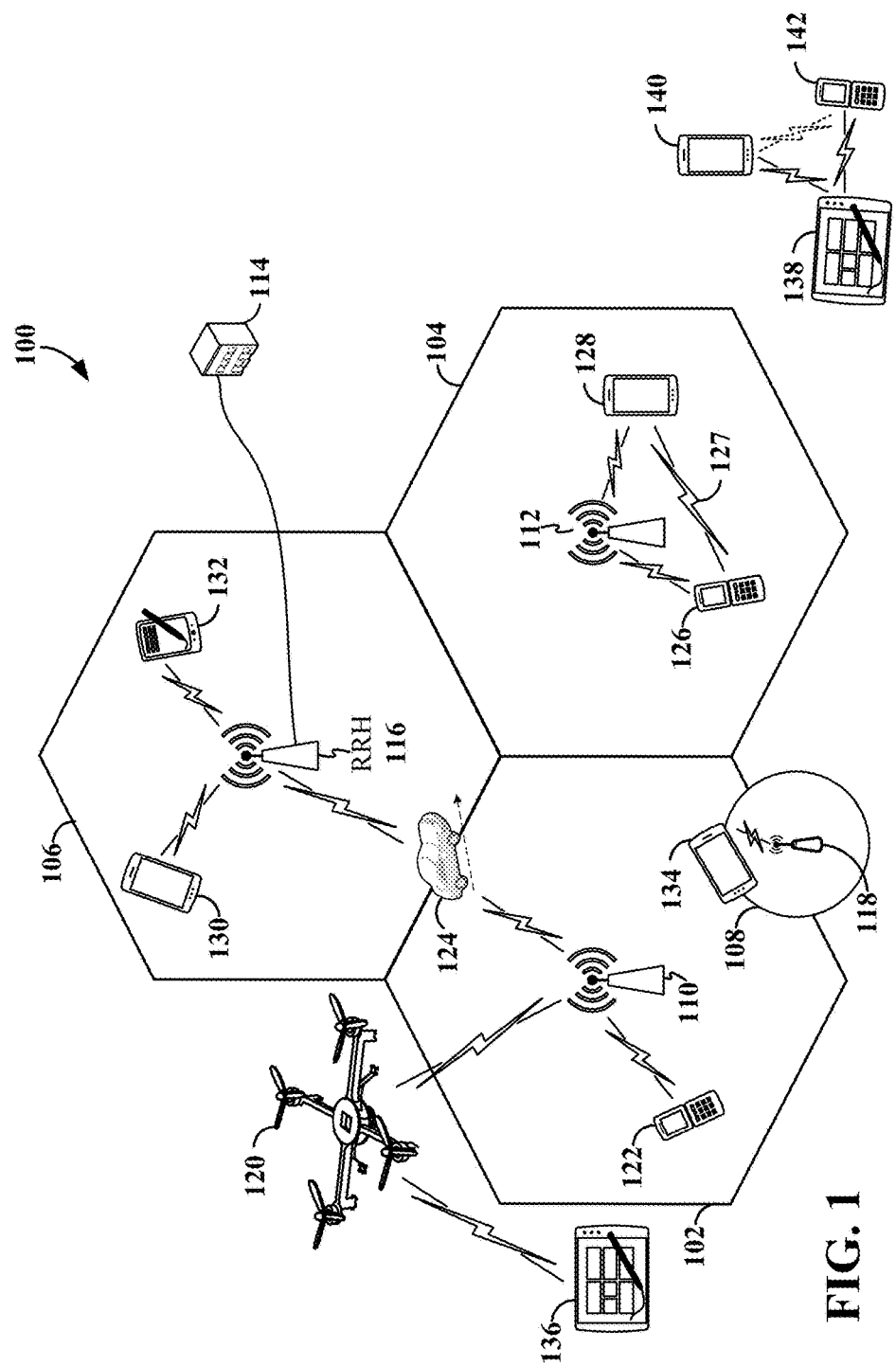
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. In some examples, the radio access network 100 may be a network employing continued evolved wireless communication technologies. This may include, for example, a fifth generation (5G) or New Radio (NR) wireless communication technology based on a set of standards (e.g., issued by 3GPP, www.3gpp.org). For example, standards defined by the 3GPP following LTE-Advanced or by the 3GPP2 following CDMA2000 may be considered 5G. Standards may also include pre-3GPP efforts specified by Verizon Technical Forum and Korea Telecom SIG.

In other examples, the radio access network 100 may be a network employing a third generation (3G) wireless communication technology or a fourth generation (4G) wireless communication technology. For example, standards promulgated by the 3rd Generation Partnership Project (3GPP) and the 3rd Generation Partnership Project 2 (3GPP2) may be considered 3G or 4G, including, but not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, a medical device, implantable devices, industrial equipment, and many other devices sized, shaped, and configured for use by users.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. UEs may comprise a number of hardware structural components sized, shaped, and arranged to help in communication; such components can include antennas, antenna arrays, RF chains, amplifiers, one or more processors, etc. electrically coupled to each other.

In another example, a mobile network node (e.g., quad-copter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), discrete Fourier transform spread orthogonal frequency division multiple access (DFT-s-OFDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), discrete Fourier transform spread orthogonal frequency division multiplexing (DFT-s-OFDM) or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
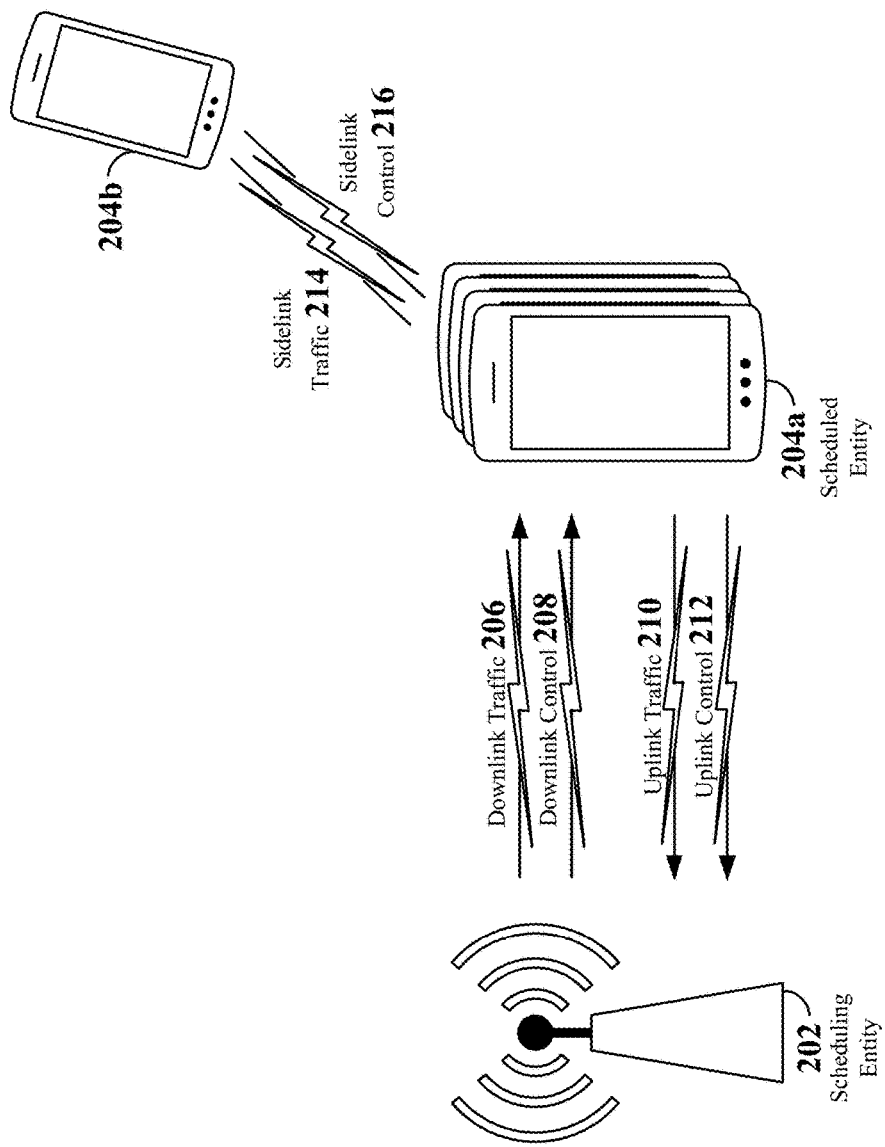
FIG. 2 is a block diagram conceptually illustrating an example of a scheduling entity communicating with one or more scheduled entities.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
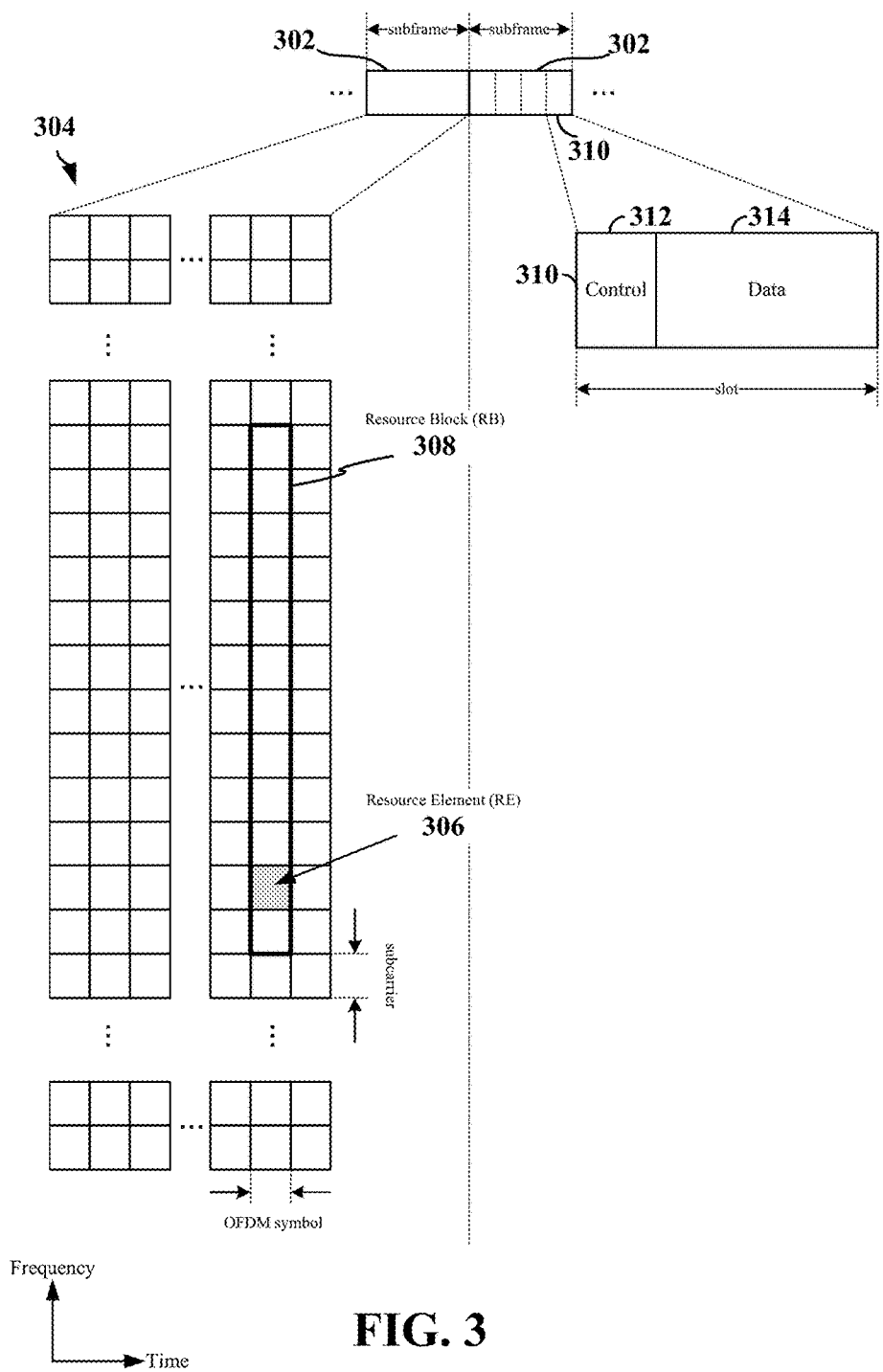
FIG. 3 is schematic diagram illustrating organization of wireless resources in an air interface utilizing orthogonal frequency divisional multiplexing (OFDM).

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a normal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 202) may allocate one or more REs 306 (e.g., within a control region 312) to carry DL control information 208 including one or more DL control channels, such as a PBCH; a PSS; a SSS; a physical control format indicator channel (PCFICH), which carrier the Control Format Indicator (CFI); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The number N of control OFDM symbols in the subframe or slot is signaled by the CFI in the PCFICH. The value of the CFI may depend on the channel bandwidth. For example, for a channel bandwidth of 1.4 MHz, the CFI value may be 2, 3, or 4 (indicating 2, 3, or 4 control OFDM symbols, respectively), whereas for a channel bandwidth of 3 MHz, the CFI value may be 1, 2, or 3 (indicating 1, 2, or 3 control OFDM symbols, respectively). The 1.4 MHz channel may require more control OFDM symbols than the 3 MHz channel since there are fewer subcarriers in the frequency domain. The CFI value is determined by the base station (scheduling entity), and may depend, for example, on the number of active connections in the cell.

The PCFICH may occupy, for example, 16 resource elements (REs) in the first OFDM symbol of the subframe or slot. The 16 REs are divided into four resource element groups (REGs), which are distributed within the first OFDM symbol. The exact position of each REG of the PCFICH may be determined from the physical cell ID, the number of frequency carriers per resource block and the number of resource blocks in the channel bandwidth.

The PDCCH carries downlink control information (DCI) including but not limited to power control commands, scheduling information, a grant, and/or an assignment of REs for DL and UL transmissions. The PDCCH may be transmitted over an aggregation of contiguous control channel elements (CCEs) in the control section of the subframe or slot. In some examples, one CCE includes nine continuous resource element groups (REGs), where each REG includes four resource elements (REs). Thus, one CCE may include thirty-six REs. In some examples, the PDCCH may be constructed from a variable number of CCEs, depending on the PDCCH format (or aggregation level). Each PDCCH format (or aggregation level) supports a different DCI length. In some examples, PDCCH aggregation levels of 1, 2, 4, and 8 may be supported, corresponding to 1, 2, 4, or 8 contiguous CCEs, respectively.

The DCI within the PDCCH provides downlink resource assignments and/or uplink resource grants for one or more scheduled entities. Multiple PDCCHs may be transmitted each subframe or slot and each PDCCH may carry user-specific DCI or common DCI (e.g., control information broadcast to a group of scheduled entities). Each DCI may further include a cyclic redundancy check (CRC) bit that is scrambled with a radio network temporary identifier (RNTI), which may be a specific user RNTI or a group RNTI, to allow the UE to determine the type of control information sent in the PDCCH.

Since the UE is unaware of the particular aggregation level of the PDCCH or whether multiple PDCCHs may exist for the UE in the subframe or slot, the UE may perform blind decoding of various decoding candidates within the first N control OFDM symbols identified by the CFI of the PCFICH. Each decoding candidate includes a collection of one or more consecutive CCEs based on an assumed DCI length (e.g., PDCCH aggregation level). To limit the number of blind decodes, a UE-specific search space and a common search space may be defined. The search spaces limit the number of blind decodes that the UE performs for each PDCCH format combination. The common search space consists of CCEs used for sending control information that is common to a group of UEs. Thus, the common search space is monitored by all UEs in a cell and may be static between subframes or slots. The UE-specific search space consists of CCEs used for sending control information for particular UEs. The starting point (offset or index) of a UE-specific search space may be different for each UE and each UE may have multiple UE-specific search spaces (e.g., one for each aggregation level). The UE may perform blind decoding over all aggregation levels and corresponding UE-specific search spaces to determine whether at least one valid DCI exists for the UE within the UE-specific search space(s).

Thus, the PDCCH decode complexity may be driven by the number of different DCI lengths and the sizes of the common and UE-specific search spaces. In next generation access networks, more or different DCI lengths may be required to support different types of user data traffic and different bandwidths. For example, for uplink grants, additional DCI lengths may be needed to support both OFDM and SC-FDM transmissions. As another example, if user data traffic in a cell is downlink-heavy, the search space in uplink slots may need to be restricted to reduce UE decode complexity. Since the PDCCH processing timeline affects the user data traffic decoding timeline, in various aspects of the disclosure, the search space may be optimized to improve the user data traffic decoding timeline.

The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 204) may utilize one or more REs 306 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The two main types of reference signals transmitted in the uplink include the uplink demodulation reference signal (DMRS) and the sounding reference signal (SRS). The uplink DMRS enables coherent demodulation of uplink transmissions in the PUSCH and/or PUCCH. The SRS may be used by the scheduling entity to estimate the uplink channel, which may facilitate uplink scheduling, power control, and diversity transmission in the downlink. In various aspects of the disclosure, the location of the SRS within the uplink subframe or slot may be optimized to improve the decoding timeline of uplink user data traffic.

Figure 4:
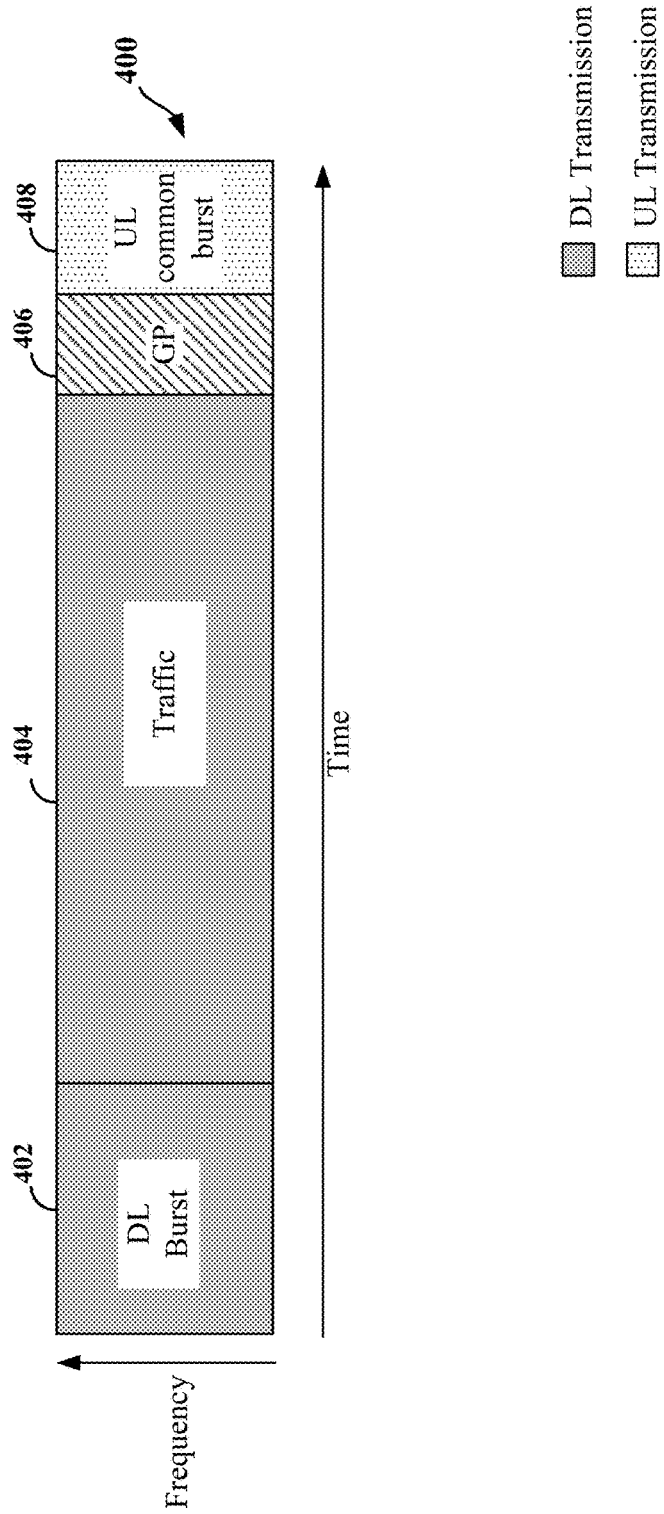
FIG. 4 is a diagram illustrating an example of a slot that may be used in some networks according to some aspects of the disclosure.
Figure 5:
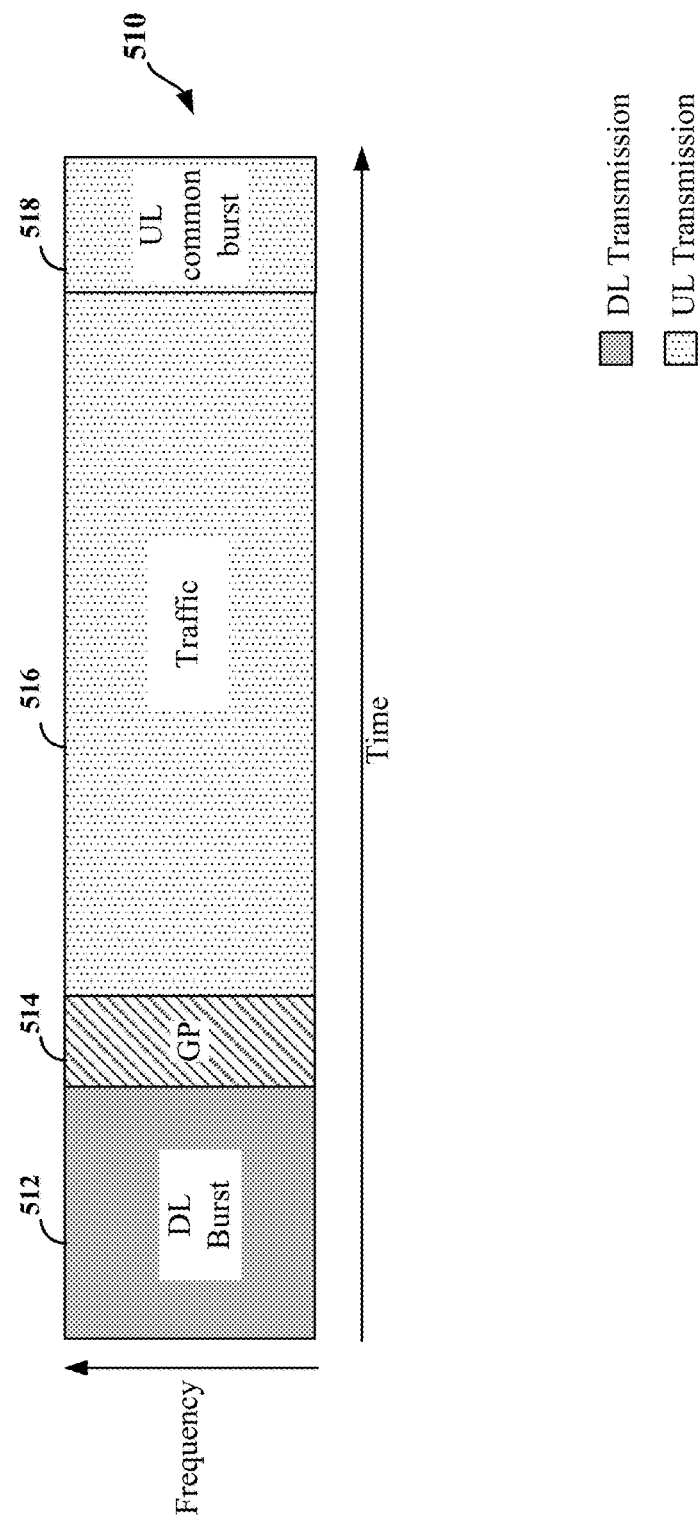
FIG. 5 is a diagram illustrating another example of a slot that may be used in some networks according to some aspects of the disclosure.

FIGS. 4 and 5 illustrate examples of slots 400 and 500 that may be used in some networks. In some examples, each of the slots 400 and 500 shown in FIGS. 4 and 5 is a time division duplexed slot that includes time-frequency resources divided into transmit and receive portions in the time domain. For example, each slot may contain a plurality of consecutive subcarriers in the frequency domain and a plurality of OFDM symbols in the time domain. The number of subcarriers may be determined, for example, by the system bandwidth supported by the network or a device bandwidth supported by a particular scheduled entity. The number of OFDM symbols within each slot may be determined, for example, based on the system requirements in the network and/or the particular slot structure utilized for a current slot.

FIG. 4 is a diagram illustrating an example of a downlink (DL)-centric slot 400 according to some aspects of the disclosure. In the example shown in FIG. 4, time is illustrated along a horizontal axis, while frequency is illustrated along a vertical axis. The time-frequency resources of the DL-centric slot 400 may be divided into a DL burst 402, a DL traffic region 404 and an UL burst 408.

The DL burst 402 may exist in the initial or beginning portion of the DL-centric slot. The DL burst 402 may include any suitable DL information in one or more channels. In some examples, the DL burst 402 may include various scheduling information and/or control information corresponding to various portions of the DL-centric slot. In some configurations, the DL burst 402 may be a physical DL control channel (PDCCH). The DL-centric slot may also include a DL traffic region 404. The DL traffic region 404 may sometimes be referred to as the payload of the DL-centric slot. The DL traffic region 404 may include the communication resources utilized to communicate DL user data traffic from the scheduling entity 202 (e.g., gNB) to the scheduled entity 204 (e.g., UE). In some configurations, the DL traffic region 404 may include a physical DL shared channel (PDSCH).

The UL burst 408 may include, for example, uplink control information (UCI) within a PUCCH. In some examples, the UCI may include feedback information corresponding to various other portions of the DL-centric slot. For example, the UCI may include feedback information corresponding to the control region 402 and/or DL traffic region 404. Non-limiting examples of feedback information may include an ACK signal, a NACK signal, a HARQ indicator, and/or various other suitable types of feedback information. The UCI may also include scheduling requests for uplink user data traffic, channel quality information (CQI), multiple-input-multiple-output (MIMO parameters, and various other suitable types of information. The UL burst 406 may further include other types of information in one or more other channels, such as information pertaining to random access channel (RACH) procedures on a physical random access channel (PRACH).

As illustrated in FIG. 4, the end of the DL traffic region 404 may be separated in time from the beginning of the UL burst 408. This time separation may sometimes be referred to as a gap, a guard period, a guard interval, and/or various other suitable terms, hereinafter referred to as a guard period (GP) 406. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

FIG. 5 is a diagram showing an example of an uplink (UL)-centric slot 500 according to some aspects of the disclosure. In the example shown in FIG. 5, time is illustrated along a horizontal axis, while frequency is illustrated along a vertical axis. The time-frequency resources of the UL-centric slot 500 may be divided into a DL burst 502, an UL traffic region 506 and an UL burst 508.

The DL burst 502 may exist in the initial or beginning portion of the UL-centric slot. The DL burst 502 in FIG. 5 may be similar to the DL burst 402 described above with reference to FIG. 4. The UL-centric slot may also include an UL traffic region 506. The UL traffic region 506 may sometimes be referred to as the payload of the UL-centric slot. The UL traffic region 506 may include the communication resources utilized to communicate UL user data traffic from the scheduled entity 204 (e.g., UE) to the scheduling entity 202 (e.g., gNB). In some configurations, the UL traffic region 506 may be a physical UL shared channel (PUSCH). In addition, in some examples, the PUSCH may further carry various UCI, such as feedback information, scheduling requests, or an aperiodic CQI report. The UL burst 508 in FIG. 5 may be similar to the UL burst 408 described above with reference to FIG. 4.

As illustrated in FIG. 5, the end of the DL burst 502 may be separated in time from the beginning of the UL traffic region 506. This time separation may sometimes be referred to as a gap, guard period, guard interval, and/or various other suitable terms, hereinafter referred to as a guard period (GP) 504. This separation provides time for the switch-over from DL communication (e.g., reception operation by the scheduled entity 204 (e.g., UE)) to UL communication (e.g., transmission operation by the scheduled entity 204 (e.g., UE)). One of ordinary skill in the art will understand that the foregoing is merely one example of an UL-centric slot, and alternative structures having similar features may exist without necessarily deviating from the aspects described herein. In some examples, the UL-centric slot 500 may include the DL burst 502 and only one of the UL traffic region 506 or UL burst 508 (e.g., the UL region of the slot may include only UL control information).

Figure 6:
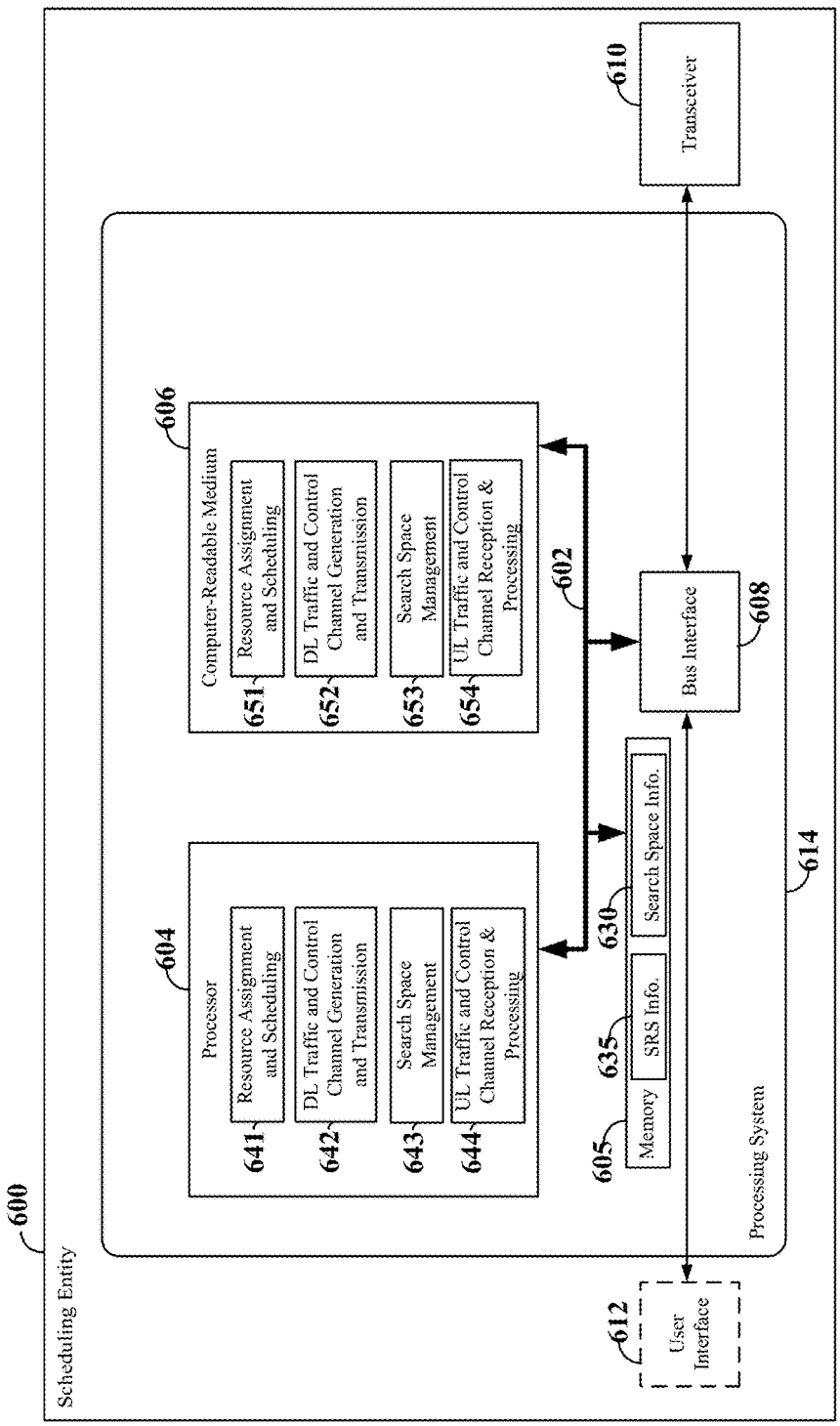
FIG. 6 is a block diagram illustrating an example of a hardware implementation for a scheduling entity employing a processing system according to some aspects of the disclosure.

FIG. 6 is a block diagram illustrating an example of a hardware implementation for a scheduling entity 600 employing a processing system 614. For example, the scheduling entity 600 may be a base station as illustrated in FIGS. 1 and/or 2. In another example, the scheduling entity 600 may be a user equipment as illustrated in FIGS. 1 and/or 2.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes described below. The processor 604 may in some instances be implemented via a baseband or modem chip and in other implementations, the processor 604 may itself comprise a number of devices distinct and different from a baseband or modem chip (e.g., in such scenarios is may work in concert to achieve embodiments discussed herein). And as mentioned above various hardware arrangements and components outside of a baseband modem processor can be used in implementations, including RF-chains, power amplifiers, modulators, buffers, interleavers, adders/summers, etc.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, an optional user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include resource assignment and scheduling circuitry 641, configured to generate, schedule, and modify a resource assignment or grant of time-frequency resources (e.g., a set of one or more resource elements). For example, the resource assignment and scheduling circuitry 641 may schedule time-frequency resources within a plurality of time division duplex (TDD) and/or frequency division duplex (FDD) subframes or slots to carry user data traffic and/or control information to and/or from multiple UEs (scheduled entities).

The resource assignment and scheduling circuitry 641 may further be configured to schedule a sounding reference signal (SRS) and uplink demodulation reference signal (DMRS) within an uplink-centric slot. In some examples, the SRS may be scheduled at the end of an uplink region of the uplink-centric slot. For example, the SRS may be scheduled after transmission of uplink information (e.g., at least one of uplink user data traffic or uplink control information). Scheduling the SRS at the end of the uplink-centric slot may provide more time for the scheduling entity to process the uplink user data traffic and generate acknowledgement information for insertion in a subsequent slot (e.g., the next slot or any other subsequent slot).

In some examples, the SRS may be scheduled at the start of the uplink region of the uplink-centric slot. For example, the SRS may be scheduled prior to transmission of the uplink information (e.g., at least one of the uplink user data traffic or uplink control information). Scheduling the SRS at the start of the uplink region may provide more time for the scheduled entity to decode and process the uplink grant within the PDCCH before transmitting the uplink user data on the uplink grant. In some examples, the SRS may be placed prior to the DMRS to provide better uplink channel estimation for the uplink user data traffic and uplink control information (e.g., PUSCH/PUCCH). In some examples, the SRS may be placed after the DMRS to enable DMRS alignment between the uplink-centric slot and a downlink-centric slot transmitted in an adjacent cell. The resource assignment and scheduling circuitry 641 may further operate in coordination with resource assignment and scheduling software 651.

The processor 604 may further include downlink (DL) traffic and control channel generation and transmission circuitry 642, configured to generate and transmit downlink user data traffic and control signals/channels. For example, the DL traffic and control channel generation and transmission circuitry 642 may be configured to generate master information blocks (MIBs), master or other system information blocks (SIBs), and/or radio resource control (RRC) connection or configuration messages, and various channels, such as the PBCH (which may carry the MIB and/or SIB), PSS, SSS, and/or physical hybrid automatic repeat request (HARQ) indicator channel (PHICH).

The DL traffic and control channel generation and transmission circuitry 642 may further be configured to generate sounding reference signal (SRS) information 635 indicating the location (placement) of the SRS within an uplink-centric slot and to broadcast the SRS information 635 to scheduled entities within the cell. In some examples, the SRS information 635 may be transmitted dynamically within the downlink control region (e.g., within the DCI of the PDCCH) of one or more slots. In other examples, the SRS information 635 may be transmitted semi-statically within a MIB, SIB, and/or RRC configuration message. The SRS information 635 may be maintained, for example, within memory 605.

The DL traffic and control channel generation and transmission circuitry 642 may further be configured to generate a physical downlink shared channel (PDSCH) including downlink user data traffic. In addition, the DL traffic and control channel generation and transmission circuitry 642 may operate in coordination with the resource assignment and scheduling circuitry 641 to schedule the DL user data traffic and/or control information and to place the DL user data traffic and/or control information onto a time division duplex (TDD) or frequency division duplex (FDD) carrier within one or more subframes or slots in accordance with the resources assigned to the DL user data traffic and/or control information. The DL traffic and control channel generation and transmission circuitry 642 may further be configured to multiplex DL transmissions utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The DL traffic and control channel generation and transmission circuitry 642 may further be configured to generate a physical control format indicator channel (PCFICH) including a control format indicator (CFI). The CFI may carry the number N of control OFDM symbols in a current subframe or slot. The DL traffic and control channel generation and transmission circuitry 642 may determine the value of the CFI based on, for example, the channel bandwidth and/or the number of active connections (e.g., active UEs) in the cell. For example, for a channel bandwidth of 1.4 MHz, the CFI value may be 2, 3, or 4 (indicating 2, 3, or 4 control OFDM symbols, respectively), whereas for a channel bandwidth of 3 MHz, the CFI value may be 1, 2, or 3 (indicating 1, 2, or 3 control OFDM symbols, respectively). The DL traffic and control channel generation and transmission circuitry 642 may further operate in coordination with the resource assignment and scheduling circuitry 641 to map the PCFICH to a set of four resource element groups (REGs) distributed within the first OFDM symbol of the current subframe or slot.

The DL traffic and control channel generation and transmission circuitry 642 may further be configured to generate a physical downlink control channel (PDCCH) including downlink control information (DCI). In some examples, the DCI may include control information indicating an assignment of downlink resources for downlink data or a grant of uplink or sidelink resources for one or more scheduled entities. The DL traffic and control channel generation and transmission circuitry 642 may further generate a CRC code within the DCI that is scrambled with the UE ID (e.g., a specific UE ID or a group UE ID).

The DL traffic and control channel generation and transmission circuitry 642 may further operate in coordination with the resource assignment and scheduling circuitry 641 to map the PDCCH to an aggregation of contiguous control channel elements (CCEs) in the first N OFDM symbols of the slot, where N is determined by the CFI. In some examples, the number of CCEs used to transmit the PDCCH may be variable based on the DCI length. In addition, the CCEs allocated to PDCCH may correspond to a common or UE-specific search space. In various aspects of the disclosure, the size of the search space may be optimized based on one or more fixed or time-varying parameters. For example, the size of a search space allocated to a PDCCH may be selected based on slot information related to the slot, as described further below. The DL traffic and control channel generation and transmission circuitry 642 may further operate in coordination with DL data and control channel generation and transmission software 652.

The processor 604 may further include search space management circuitry 643, configured to define one or more search spaces, each corresponding to different slot information. For example, the slot information may indicate one or more attributes of the slot, including, but not limited to, the type of slot (e.g., uplink-centric or downlink-centric), the type of user data traffic transmitted in the slot, the number of scheduled entities served in the slot (e.g., the number of scheduled entities transmitting/receiving user data traffic in the slot), the number of mini-slots included within the slot, user-specific slot attributes, and/or a slot index identifying the slot.

In some examples, one or more uplink search spaces (e.g., within a PDCCH transmitted in a DL burst) may be defined for uplink-centric slots and one or more downlink search spaces (e.g., within a PDCCH transmitted in a DL burst) may be defined for downlink-centric slots. The size of the uplink and downlink search spaces may be the same or different. In some examples, the uplink and downlink search spaces are associated with common search spaces. In other examples, the uplink and downlink search space sizes are associated with UE-specific search spaces. In addition, multiple uplink search spaces and downlink search spaces may be defined, each for a particular DCI size (aggregation level). The aggregation levels may be the same on the uplink and downlink or different on the uplink and downlink. For example, there may be more uplink search spaces (e.g., more aggregation levels) defined for uplink-centric slots than for downlink-centric slots to support both OFDM and SC-FDM transmissions on the uplink. As another example, one or more reduced size uplink search spaces may be defined to restrict the search space in uplink-centric slots, thereby reducing PDCCH decoding complexity. This may be beneficial, for example, in cells with large amounts of downlink user data traffic.

In some examples, search spaces may be defined such that one or more search spaces are subsets of another search space. For example, a large search space may defined corresponding to a first attribute of the slot and a smaller search space within the large search space may be defined corresponding to a second attribute of the slot. In this example, the resource elements (CCEs) defined for the large search space may include the resource elements (CCEs) defined for the small search space. In some examples, the large search space may correspond to a downlink-centric slot, while the smaller search space may correspond to an uplink-centric slot. By defining the uplink-centric search space within the downlink-centric search space, the scheduled entity may still be able to blind decode the necessary decoding candidates if the type of slot (e.g. uplink-centric or downlink-centric) is unknown.

In some examples, different search spaces may be defined for different numbers of scheduled entities served in a slot (e.g., different numbers of scheduled entities transmitting/receiving user data traffic in a slot). For example, a threshold number of scheduled entities may be defined for a slot. If the number of scheduled entities transmitting/receiving user data traffic in the slot is greater than (or greater than or equal to) the threshold number of scheduled entities, a larger search space may be utilized to accommodate the number of DCI needed to be transmitted in the slot. However, if the number of scheduled entities transmitting or receiving user data traffic in the slot is less than (or less than or equal to) the threshold number of scheduled entities, a smaller search space may be utilized.

In some examples, search spaces may be defined for particular slots. For example, the search space size for one or more slots may be predefined such that a particular search space may be associated with a particular slot index identifying the slot. As an example, one or more slots may be reserved for large bandwidth user data traffic, and a particular search space may be defined for these slots. In general, the number of scheduled entities served by a slot carrying large bandwidth user data traffic may be small, and therefore, a smaller search space may be defined for this type of slot.

In some examples, search spaces may be defined based on whether the slot includes mini-slots. If the slot contains two or more mini-slots, each may require separate scheduling, thus increasing the amount of PDCCH resources needed in the slot. Therefore, the search space size for a slot containing mini-slots may be greater than a slot that does not contain any mini-slots. In addition, the search space size may vary based on the number of mini-slots included within a slot.

In some examples, the different search space sizes may be defined for all scheduled entities or only certain scheduled entities. For example, the common and/or UE-specific search space in a slot may be separately configured for each scheduled entity or may be the same for all scheduled entities. In addition, the different search space sizes may be defined based on two or more of the above-listed slot attributes or on any other suitable slot attribute.

In some examples, the search space of one or more slots may be empty. For example, with semi-persistent scheduling (SPS), the scheduled entity may be pre-configured with a periodicity of downlink assignments or uplink grants. Once configured, the scheduled entity may receive downlink transmissions at regular intervals or transmit uplink transmissions at regular intervals according to the periodicity. Thus, during SPS, the resource assignments may remain fixed, and as such, DCI may not need to be included within slots carrying SPS transmissions.

In some examples, the search space management circuitry 643 may maintain the respective search spaces and corresponding slot information (e.g., slot attributes) for each of the respective search spaces as search space information 630 within memory 605. The search space management circuitry 643 may further operate in coordination with the DL traffic and control channel generation and transmission circuitry 642 to transmit the search space information semi-statically to scheduled entities within the cell. For example, the search space management circuitry 643 may transmit the search space information within a MIB, SIB, and/or RRC configuration message.

In some examples, the slot information for one or more slot attributes may be fixed in the cell, thus enabling the scheduled entity to identify the search space for a particular slot based on the received search space information. For example, one or more slots may be fixed as downlink-centric or uplink-centric or as carrying large bandwidth user data traffic, thus allowing the scheduled entity to identify the search space with knowledge of the slot index.

In some examples, the search space management circuitry 643 may be configured to operate in coordination with the DL traffic and control channel generation and transmission circuitry 642 to transmit the slot information (e.g., slot attributes corresponding to the selected search space) for a slot to the scheduled entities. The slot information for a current slot may be transmitted within a previous slot, or within, for example, an overhead channel transmitted within the current slot, such as the PCFICH. For example, this overhead channel may indicate whether the current slot is a downlink-centric slot or an uplink-centric slot. The search space management circuitry 643 may further operate in coordination with search space management software 653.

The processor 604 may further include uplink (UL) traffic and control channel reception and processing circuitry 644, configured to receive and process uplink control channels and uplink traffic channels from one or more scheduled entities. For example, the UL traffic and control channel reception and processing circuitry 644 may be configured to receive a scheduling request from a scheduled entity. The UL traffic and control channel reception and processing circuitry 644 may further be configured to provide the scheduling request to the resource assignment and scheduling circuitry 641 for processing. The UL traffic and control channel reception and processing circuitry 644 may further be configured to receive uplink user data traffic from one or more scheduled entities.

In various aspects of the disclosure, the UL traffic and control channel reception and processing circuitry 644 may further be configured to receive a sounding reference signal (SRS) within an uplink region of a slot in accordance with the SRS information 635 broadcast in the cell. In general, the UL traffic and control channel reception and processing circuitry 644 may operate in coordination with the resource assignment and scheduling circuitry 641 to schedule UL traffic transmissions, DL traffic transmissions and/or DL traffic retransmissions in accordance with the received UL control information. The UL traffic and control channel reception and processing circuitry 644 may further operate in coordination with UL traffic and control channel reception and processing software 654.

Figure 7:
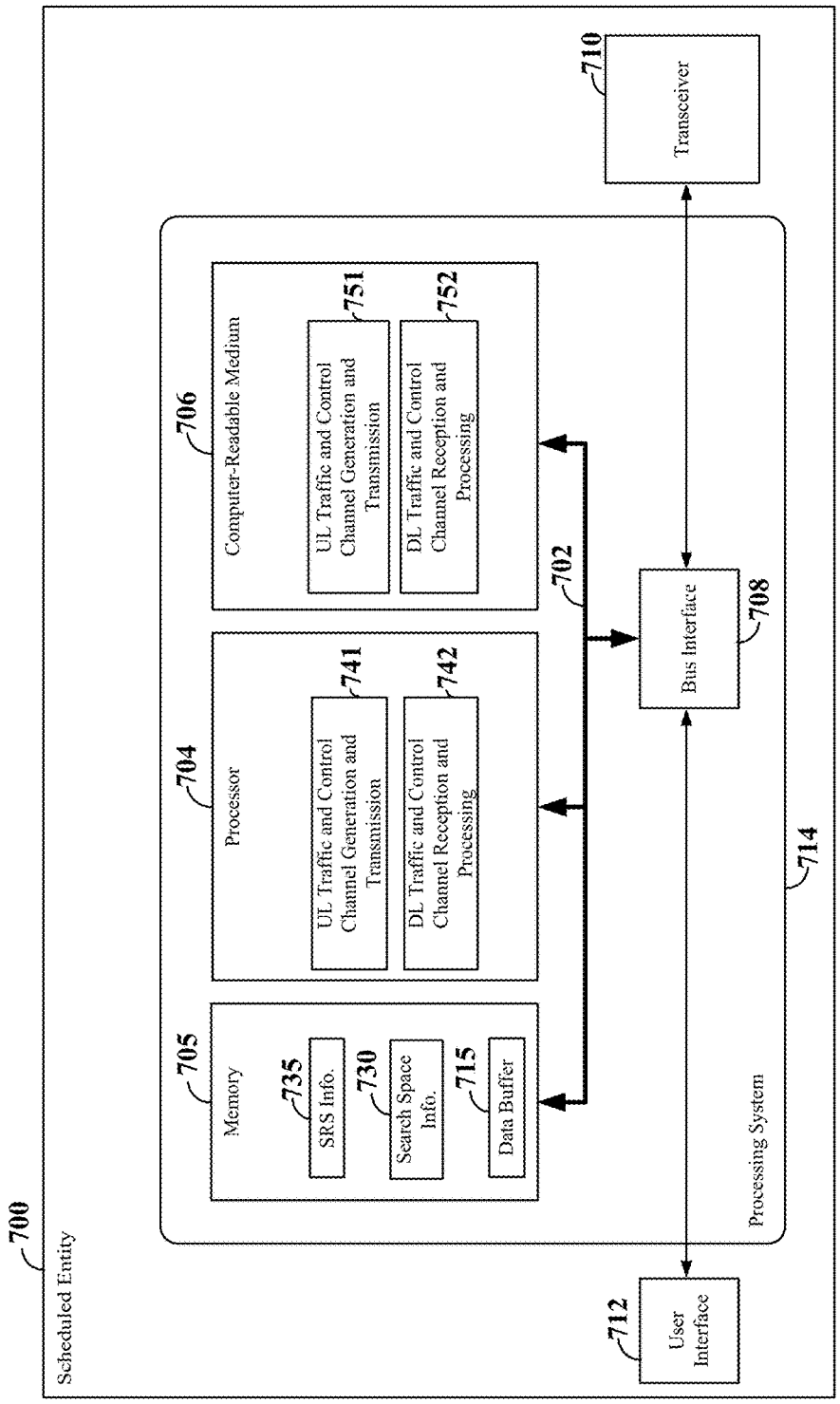
FIG. 7 is a block diagram illustrating an example of a hardware implementation for a scheduled entity employing a processing system according to some aspects of the disclosure.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1 and 2.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described below.

In some aspects of the disclosure, the processor 704 may include uplink (UL) traffic and control channel generation and transmission circuitry 741, configured to generate and transmit uplink control/feedback/acknowledgement information on an UL control channel. For example, the UL traffic and control channel generation and transmission circuitry 741 may be configured to generate and transmit an uplink control channel (e.g., a Physical Uplink Control Channel (PUCCH)). The UL traffic and control channel generation and transmission circuitry 741 may further be configured to generate and transmit uplink user data traffic on an UL traffic channel (e.g., a PUSCH) in accordance with an uplink grant.

The UL traffic and control channel generation and transmission circuitry 741 may further be configured to generate and transmit a sounding reference signal and demodulation reference signal within an uplink-centric slot. In some examples, the SRS may be transmitted at the start or end of the uplink region of the uplink-centric slot. For example, the SRS may be transmitted prior to or after transmission of the uplink information (e.g., at least one of the uplink user data traffic and uplink control information). In some examples, the SRS may be placed prior to the DMRS to provide better uplink channel estimation for the uplink user data traffic and uplink control information (e.g., PUSCH/PUCCH). In some examples, the SRS may be placed after the DMRS to enable DMRS alignment between the uplink-centric slot and a downlink-centric slot transmitted in an adjacent cell. The UL traffic and control channel generation and transmission circuitry 741 may operate in coordination with UL traffic and control channel generation and transmission software 751.

The processor 704 may further include downlink (DL) traffic and control channel reception and processing circuitry 742, configured for receiving and processing downlink user data traffic on a traffic channel (e.g., PDSCH), and to receive and process control information on one or more downlink control channels. For example, the DL traffic and control channel reception and processing circuitry 742 may be configured to receive one or more of a Physical Control Format Indicator Channel (PCFICH), Physical Hybrid Automatic Repeat Request (HARQ) Indicator Channel (PHICH), or Physical Downlink Control Channel (PDCCH) within a current slot. In some examples, received downlink user data traffic and/or control information may be temporarily stored in a data buffer 715 within memory 705.

The DL traffic and control channel reception and processing circuitry 742 may further be configured to receive sounding reference signal (SRS) information 735 indicating the location (placement) of the SRS within an uplink-centric slot. In some examples, the SRS information 735 may be received dynamically within the downlink control region (e.g., within the DCI of the PDCCH) of one or more slots. In other examples, the SRS information 735 may be received semi-statically within a MIB, SIB, and/or RRC configuration message. The DL traffic and control channel reception and processing circuitry 742 may further be configured to store the SRS information 735 within, for example, memory 705 for use by the UL traffic and control channel generation and transmission circuitry 741 when generating and transmitting the SRS and DMRS.

The DL traffic and control channel reception and processing circuitry 742 may further be configured to identify one or more search spaces within the first N symbols (e.g., within a control region) of the slot based on slot information related to the slot. The slot information may indicate one or more attributes of the slot, including, but not limited to, the type of slot (e.g., uplink-centric or downlink-centric), the type of user data traffic transmitted in the slot, the number of scheduled entities served in the slot (e.g., the number of scheduled entities transmitting/receiving user data traffic in the slot), the number of mini-slots included within the slot, user-specific slot attributes, and/or a slot index identifying the slot. The slot information may be known (e.g., the slot index may be known), may be received within the current slot (e.g., within an overhead channel, such as the PCFICH), or may be received within a previous slot (e.g., within the PDCCH or other control signal of a previous slot).

The DL traffic and control channel reception and processing circuitry 742 may further be configured to compare the slot information for the slot to search space information 730, which may be stored, for example, in memory 705. The search space information 730 may indicate respective search spaces and corresponding slot information for each of the respective search spaces. In some examples, the DL traffic and control channel reception and processing circuitry 742 may receive the search space information 730 within one or more broadcast signals. For example, the search space information 730 may be received within one or more MIBs, SIBs, and/or RRC configuration messages. The DL traffic and control channel reception and processing circuitry 742 may compare the slot information of the current slot with the search space information 730 to identify the particular search space(s) within the current slot. The identified search space(s) may be common search spaces and/or UE-specific search spaces. In addition, the starting point (or offset) within the control region of the slot for each search space may be specific to the scheduled entity.

Each search space corresponds to a set of resource elements (e.g., contiguous CCEs) that includes a plurality of decoding candidates. For each identified search space, the DL traffic and control channel reception and processing circuitry 742 may further be configured to demodulate the resource elements within the search space and perform blind decoding of the decoding candidates to determine whether at least one valid DCI exists for the scheduled entity 700 within the search space. For example, for each decoding candidate, the DL traffic and control channel reception and processing circuitry 742 may check whether the CRC was successfully decoded with the appropriate UE ID (e.g., the ID specific to the scheduled entity 700 or a group ID associated with the scheduled entity), and if so, determine that the decoding candidate represents a valid DCI (e.g., contains a PDCCH with DCI for that scheduled entity).

In some examples, the DL traffic and control channel reception and processing circuitry 742 may be configured to identify one or more uplink search spaces (e.g., within a PDCCH transmitted in a DL burst) when the slot information indicates that the slot is an uplink-centric slot. The DL traffic and control channel reception and processing circuitry 742 may be configured to identify one or more downlink search spaces (e.g., within a PDCCH transmitted in a DL burst) when the slot information indicates that the slot is a downlink-centric slot. The size of the uplink and downlink search spaces may be the same or different. In some examples, the uplink and downlink search spaces are associated with common search spaces. In other examples, the uplink and downlink search space sizes are associated with UE-specific search spaces.

In some examples, the DL traffic and control channel reception and processing circuitry 742 may be configured to identify one or more search spaces that are subsets of another search space. For example, the DL traffic and control channel reception and processing circuitry 742 may be configured to identify a large search space when the slot information indicates that the slot is a downlink-centric slot and a smaller search space within the large search space when the slot information indicates that the slot is an uplink-centric slot. In this example, the resource elements (CCEs) defined for the large search space may include the resource elements (CCEs) defined for the small search space. By defining the uplink search space within the downlink search space, the scheduled entity may still be able to blind decode the necessary decoding candidates when the slot information fails to indicate whether the current slot is downlink-centric or uplink-centric. For example, if the scheduled entity is unable to decode the overhead channel, such as the PCFICH, to determine whether the slot is downlink-centric or uplink-centric, the scheduled entity may still be able to blind decode the correct decoding candidates.

In some examples, the DL traffic and control channel reception and processing circuitry 742 may be configured to identify one or more search spaces based on the number of scheduled entities transmitting/receiving user data traffic in the current slot. In some examples, the slot information may indicate the number of scheduled entities, and the DL traffic and control channel reception and processing circuitry 742 may compare the number of scheduled entities to a threshold number of scheduled entities. If the number of scheduled entities transmitting/receiving user data traffic in the slot is greater than (or greater than or equal to) the threshold number of scheduled entities, a larger search space may be identified, whereas if the number of scheduled entities transmitting or receiving user data traffic in the slot is less than (or less than or equal to) the threshold number of scheduled entities, a smaller search space may be identified. In some examples, the slot information may indicate whether the number of scheduled entities is greater than or less than the threshold.

In some examples, the DL traffic and control channel reception and processing circuitry 742 may be configured to identify one or more search spaces based on the slot index identifying the slot. As an example, one or more slots may be reserved for large bandwidth user data traffic, and a particular search space may be utilized for these slots. In general, the number of scheduled entities served by a slot carrying large bandwidth user data traffic may be small, and therefore, a smaller search space may be identified for this type of slot.

In some examples, the DL traffic and control channel reception and processing circuitry 742 may be configured to identify one or more search spaces based on whether the slot includes mini-slots. For example, if the slot information indicates that the slot contains two or more mini-slots, a larger search space may be identified as compared to a slot that does not contain any mini-slots. In addition, the slot information may further indicate the number of mini-slots, and the DL traffic and control channel reception and processing circuitry 742 may be configured to identify different search spaces based on the number of mini-slots included within a slot.

In some examples, the DL traffic and control channel reception and processing circuitry 742 may be configured to identify one or more search spaces based on whether the search space may be separately configured for the scheduled entity. In some examples, the search space of the current slot may be empty. If the search space is empty, the DL traffic and control channel reception and processing circuitry 742 may be configured to inhibit blind decoding of any search spaces in the control region. The DL traffic and control channel reception and processing circuitry 742 may operate in coordination with DL traffic and control channel reception and processing software 752.

Figure 8:
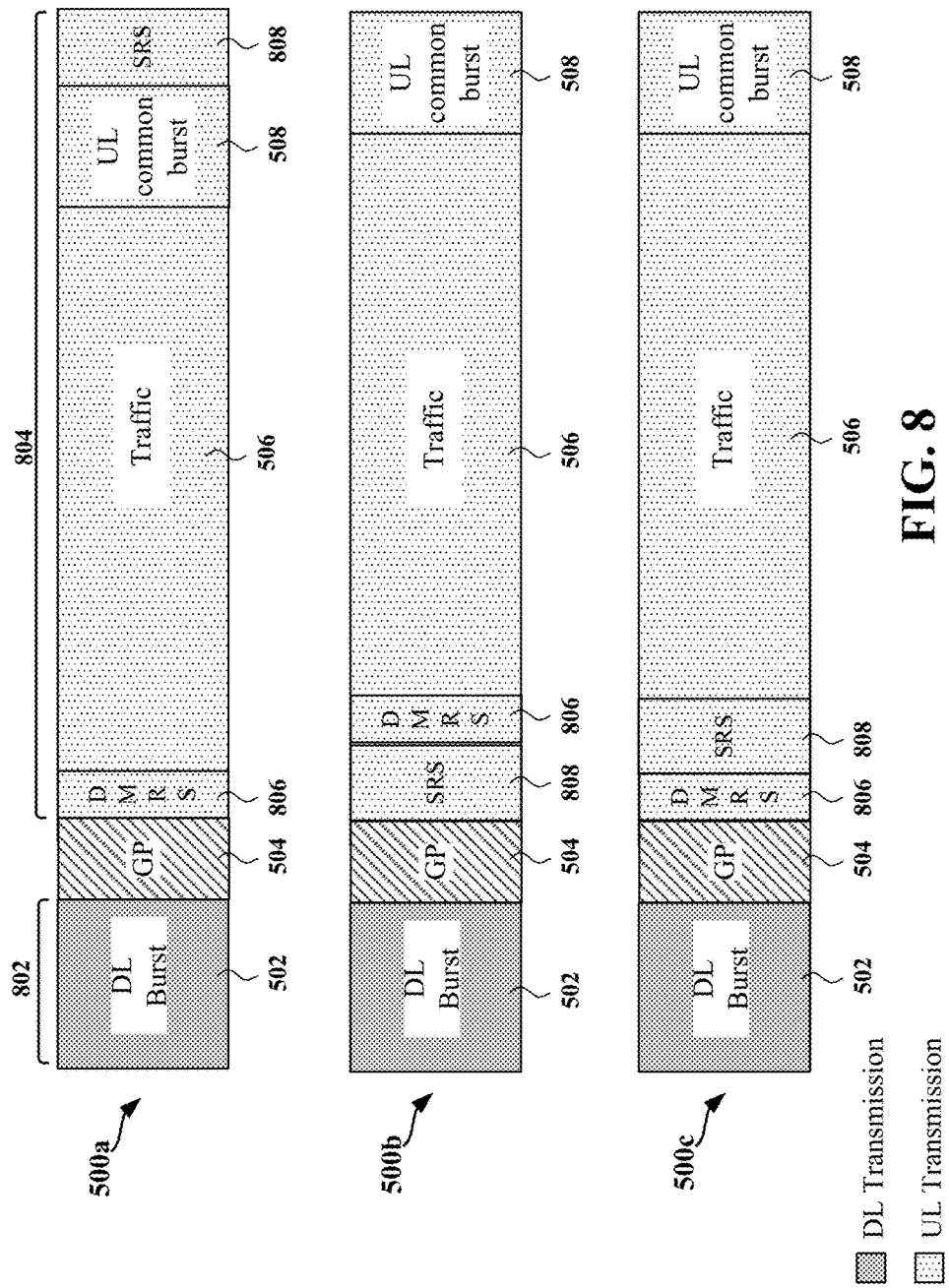
FIG. 8 is a diagram illustrating examples of slots containing different placements of the sounding reference signal according to some aspects of the disclosure.

FIG. 8 illustrates examples of slots containing different placements of the sounding reference signal 808 within an uplink-centric slot 500 according to aspects of the disclosure. The uplink-centric slot 500 includes a downlink control region 802 and an uplink region 804. The downlink control region 802 may include a downlink (DL) burst 502 within which the scheduling entity may transmit downlink control information. Following a GP 504, within the uplink region 804, the scheduled entity may transmit an uplink demodulation reference signal 806, a sounding reference signal 808, uplink user data traffic in an UL traffic region 506 and uplink control information in an UL control region (UL common burst) 508.

In some examples, the SRS 808 may be located at the end of the uplink region 804 or near the beginning of the uplink region 804. For example, as shown in uplink-centric slot 500a, the SRS 808 may be located after the UL traffic region 506 and the UP common burst 508. By transmitting the SRS 808 at the end of the uplink-centric slot, the scheduling entity may be provided more time to process the uplink user data traffic in the UL traffic region 506 and generate acknowledgement information therefore prior to the next slot.

In the example illustrated by uplink-centric slot 500b, the SRS may be located at the beginning of the uplink region 804. In this example, the SRS may be placed prior to the DMRS 806 to provide better uplink channel estimation for the uplink user data traffic and uplink control information (e.g., PUSCH/PUCCH). In the example illustrated by uplink-centric slot 500c, the SRS 808 may be placed after the DMRS 806 to enable DMRS alignment between the uplink-centric slot and a downlink-centric slot transmitted in an adjacent cell.

Figure 9:
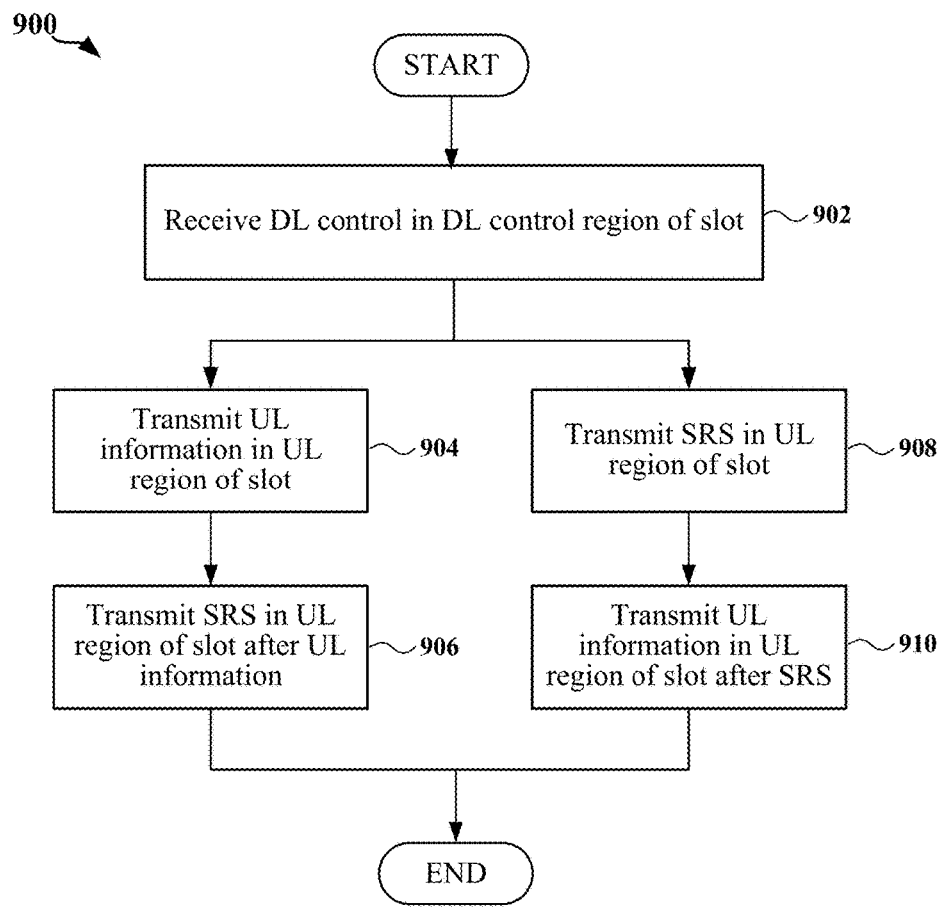
FIG. 9 is a flow chart illustrating an exemplary process for wireless communication with optimized placement of the sounding reference signal in an uplink-centric slot according to some aspects of the disclosure.

FIG. 9 is a flow chart illustrating a process 900 for wireless communication with optimized placement of the sounding reference signal in an uplink-centric slot according to an aspect of the disclosure. As described below, some or all illustrated features may be omitted in a particular implementation within the scope of the present disclosure, and some illustrated features may not be required for implementation of all embodiments. In some examples, the process 900 may be carried out by the scheduled entity illustrated in FIG. 7. In some examples, the process 900 may be carried out by any suitable apparatus or means for carrying out the functions or algorithm described below.

At block 902, the scheduled entity may receive downlink control information in a downlink (DL) control region of an uplink-centric slot. For example, the DL traffic and control channel reception and processing circuitry 742 shown and described above in connection with FIG. 7 may receive the downlink control information. In some examples, the process may proceed to block 904, where the scheduled entity may then transmit uplink information (e.g., at least one of the uplink user data traffic or uplink control information) in an uplink (UL) region of the uplink-centric slot. At block 906, the scheduled entity may then transmit a sounding reference signal (SRS) at the end of the UL region of the uplink-centric slot. For example, the scheduled entity may transmit the SRS after transmission of the uplink information.

In other examples, following reception of the downlink control information at block 902, the process may proceed to block 908, where the scheduled entity may transmit the SRS near the beginning of the UL region of the uplink-centric slot. At block 910, the scheduled entity may then transmit the uplink information in the UL region of the uplink-centric slot. Thus, the uplink user data traffic and/or uplink control information may be transmitted after transmission of the SRS. For example, the UL traffic and control channel generation and transmission circuitry 741 shown and described above in connection with FIG. 7 may generate and transmit the uplink user data traffic, uplink control information, and SRS.

Figure 10:
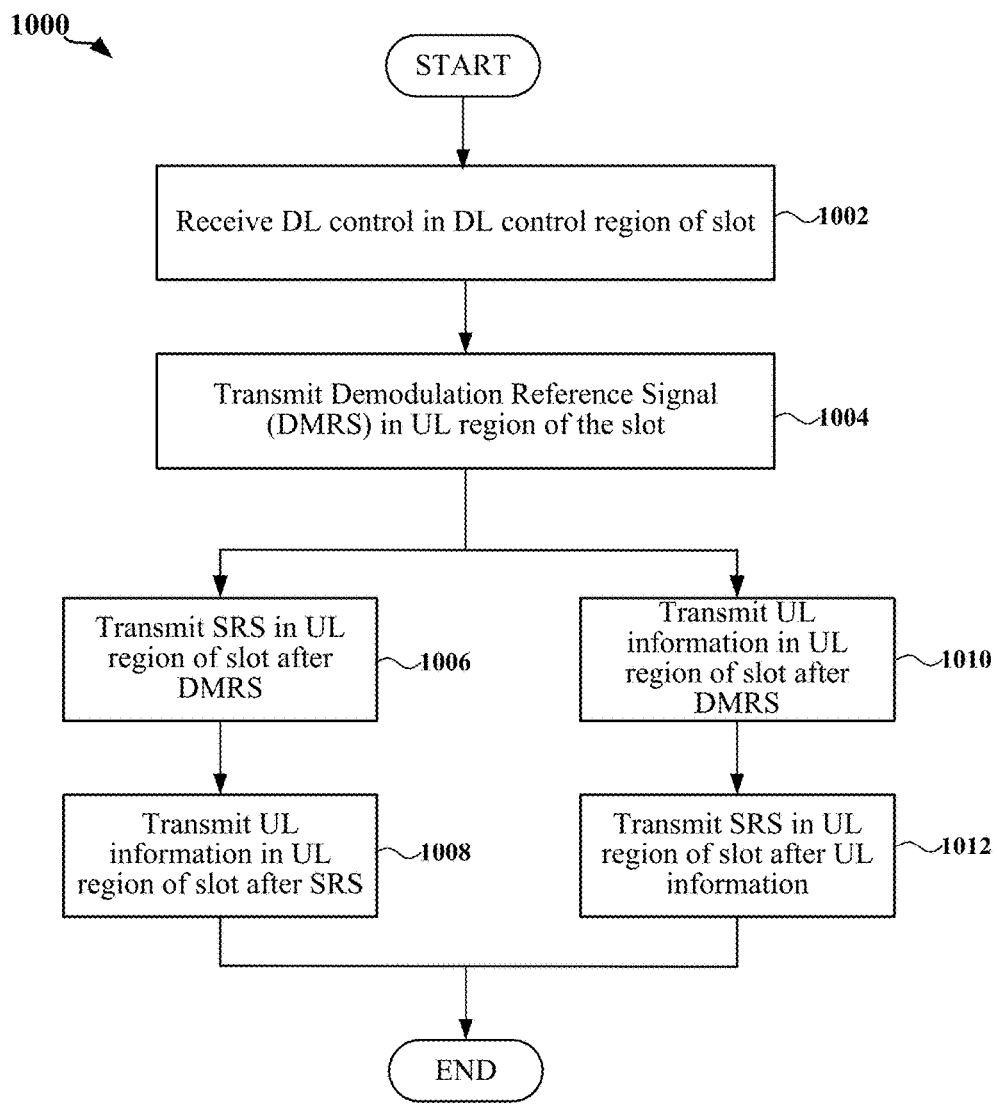
FIG. 10 is a flow chart illustrating another exemplary process for wireless communication with optimized placement of the sounding reference signal in an uplink-centric slot according to some aspects of the disclosure.

FIG. 10 is a flow chart illustrating a process 1000 for wireless communication with optimized placement of the sounding reference signal in an uplink-centric slot according to an aspect of the disclosure. As described below, some or all illustrated features may be omitted in a particular implementation within the scope of the present disclosure, and some illustrated features may not be required for implementation of all embodiments. In some examples, the process 1000 may be carried out by the scheduled entity illustrated in FIG. 7. In some examples, the process 1000 may be carried out by any suitable apparatus or means for carrying out the functions or algorithm described below.

At block 1002, the scheduled entity may receive downlink control information in a DL control region of an uplink-centric slot. For example, the DL traffic and control channel reception and processing circuitry 742 shown and described above in connection with FIG. 7 may receive the downlink control information. At 1004, the scheduled entity may transmit a demodulation reference signal (DMRS) within an UL region of the uplink-centric slot. The DMRS may be transmitted, for example, at or near the beginning of an UL traffic region of the uplink-centric slot. For example, the UL traffic and control channel generation and transmission circuitry 741 shown and described above in connection with FIG. 7 may generate and transmit the DMRS within the uplink region of the uplink-centric slot.

In some examples, the process may proceed to block 1006, where the scheduled entity may then transmit an SRS after transmission of the DMRS within the UL region of the uplink-centric slot. At block 1008, the scheduled entity may then transmit uplink information (e.g., at least one of uplink user data traffic or uplink control information) in the UL region of the uplink-centric slot. Thus, the uplink information may be transmitted after transmission of the SRS and the DMRS.

In other examples, following transmission of the DMRS at block 1010, the scheduled entity may transmit the uplink information in the UL region of the uplink-centric slot. At block 1012, the scheduled entity may then transmit SRS at the end of the UL region of the uplink-centric slot. For example, the scheduled entity may transmit the SRS after transmission of the uplink user data traffic and/or uplink control information. For example, the UL traffic and control channel generation and transmission circuitry 741 shown and described above in connection with FIG. 7 may generate and transmit the uplink user data traffic, uplink control information, and SRS.

Figure 11:
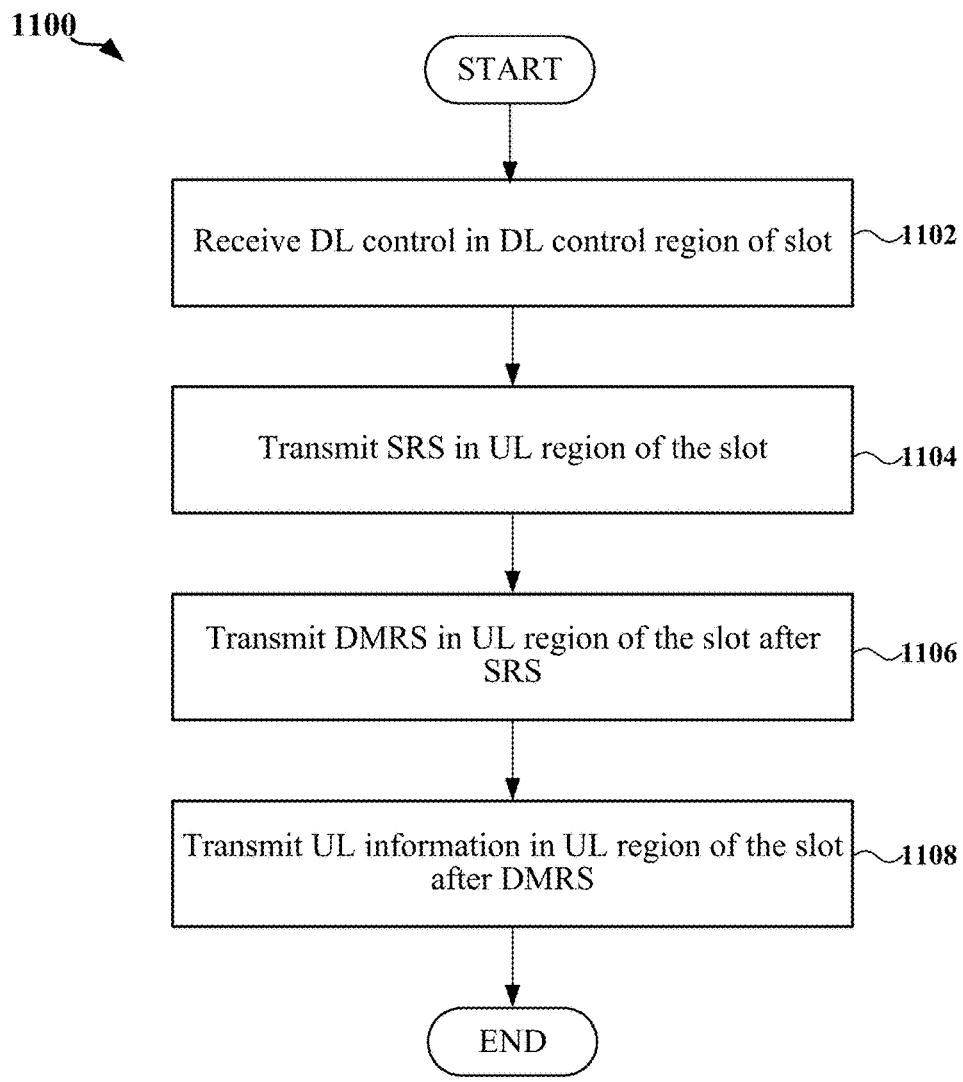
FIG. 11 is a flow chart illustrating another exemplary process for wireless communication with optimized placement of the sounding reference signal in an uplink-centric slot according to some aspects of the disclosure.

FIG. 11 is a flow chart illustrating a process 1100 for wireless communication with optimized placement of the sounding reference signal in an uplink-centric slot according to an aspect of the disclosure. As described below, some or all illustrated features may be omitted in a particular implementation within the scope of the present disclosure, and some illustrated features may not be required for implementation of all embodiments. In some examples, the process 1100 may be carried out by the scheduled entity illustrated in FIG. 7. In some examples, the process 1100 may be carried out by any suitable apparatus or means for carrying out the functions or algorithm described below.

At block 1102, the scheduled entity may receive downlink control information in a DL control region of an uplink-centric slot. For example, the DL traffic and control channel reception and processing circuitry 742 shown and described above in connection with FIG. 7 may receive the downlink control information. At block 1104, the scheduled entity may transmit an SRS at or near the beginning of an UL region of the uplink-centric slot. At block 1106, the scheduled entity may then transmit a DMRS within the UL region of the uplink-centric slot after transmission of the SRS.

At block 1108, the scheduled entity may then transmit uplink information (e.g., at least one of uplink user data traffic or uplink control information) in the UL region of the uplink-centric slot. Thus, the uplink information may be transmitted after transmission of both the SRS and the DMRS. For example, the UL traffic and control channel generation and transmission circuitry 741 shown and described above in connection with FIG. 7 may generate and transmit the uplink user data traffic, uplink control information, DMRS, and SRS.

Figure 12:
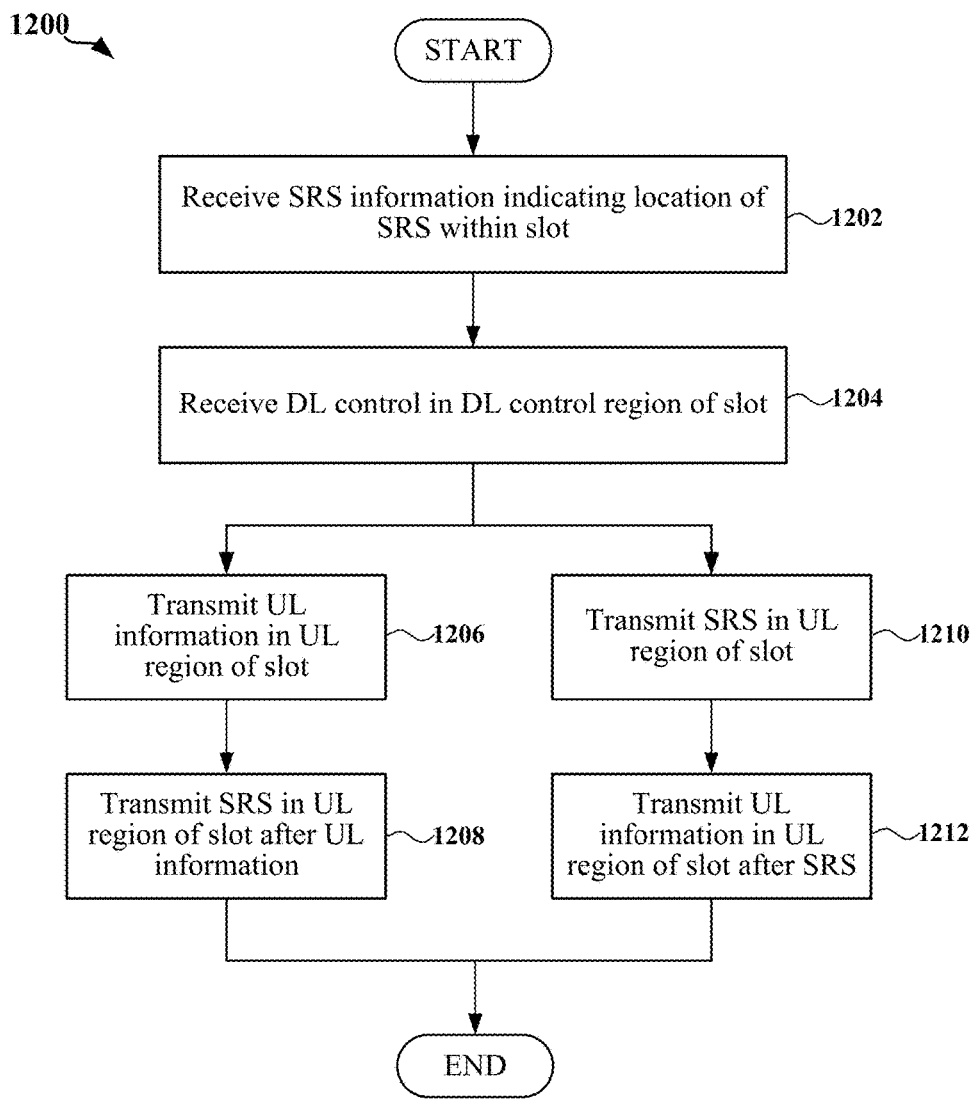
FIG. 12 is a flow chart illustrating another exemplary process for wireless communication with optimized placement of the sounding reference signal in an uplink-centric slot according to some aspects of the disclosure.

FIG. 12 is a flow chart illustrating a process 1200 for wireless communication with optimized placement of the sounding reference signal in an uplink-centric slot according to an aspect of the disclosure. As described below, some or all illustrated features may be omitted in a particular implementation within the scope of the present disclosure, and some illustrated features may not be required for implementation of all embodiments. In some examples, the process 1200 may be carried out by the scheduled entity illustrated in FIG. 7. In some examples, the process 1200 may be carried out by any suitable apparatus or means for carrying out the functions or algorithm described below.

At block 1202, the scheduled entity may receive SRS information indicating the location of an SRS within an uplink-centric slot. In some examples, the SRS information may be received within the DL control region of one or more slots. In other examples, the SRS information may be received via one or more of a radio resource control configuration message, a master information block, or a system information block. At block 1204, the scheduled entity may receive downlink control information in a DL control region of the uplink-centric slot. For example, the DL traffic and control channel reception and processing circuitry 742 shown and described above in connection with FIG. 7 may receive the SRS information and the downlink control information.

In some examples, the process may proceed to block 1206, where the scheduled entity may then transmit uplink information (e.g., at least one of uplink user data traffic or uplink control information) in an UL region of the uplink-centric slot. At block 1208, the scheduled entity may then transmit a sounding reference signal (SRS) at the end of the UL region of the uplink-centric slot. For example, the scheduled entity may transmit the SRS after transmission of the uplink information.

In other examples, following reception of the downlink control information at block 1204, the process may proceed to block 1210, where the scheduled entity may transmit the SRS near the beginning of the UL region of the uplink-centric slot. At block 1212, the scheduled entity may then transmit the uplink information (e.g., at least one of uplink user data traffic or uplink control information) in the UL region of the uplink-centric slot. Thus, the uplink user data traffic and/or uplink control information may be transmitted after transmission of the SRS. For example, the UL traffic and control channel generation and transmission circuitry 741 shown and described above in connection with FIG. 7 may generate and transmit the uplink user data traffic, uplink control information, and SRS.

In one configuration, a scheduled entity apparatus within a wireless communication network includes means for receiving downlink control information in a downlink control region of a slot of the plurality of slots, means for transmitting uplink information including at least one of uplink control information or uplink user data traffic corresponding to the downlink control information in an uplink region of the slot, and means for transmitting a sounding reference signal in the uplink region of the slot. The sounding reference signal is transmitted prior to transmitting the uplink information or after transmitting the uplink information.

In one aspect, the aforementioned means for receiving downlink control information in the downlink link control region of the slot, means for transmitting uplink information in the uplink region of the slot, and means for transmitting a sounding reference signal in the uplink region of the slot may be the transceiver 710 and the processor(s) 704 shown in FIG. 7 configured to perform the functions recited by the aforementioned means. For example, the aforementioned means for receiving the downlink control information in the downlink control region of the slot may include the transceiver 710 and the DL traffic and control channel reception and processing circuitry 742 shown in FIG. 7. As another example, the aforementioned means for transmitting the uplink information in the uplink region of the slot and the means for transmitting the sounding reference signal in the uplink region of the slot may include the transceiver 710 and the UL traffic and control channel generation and transmission circuitry 741 shown in FIG. 7. In another aspect, the aforementioned means may be a circuit or any apparatus configured to perform the functions recited by the aforementioned means.

Figure 13:
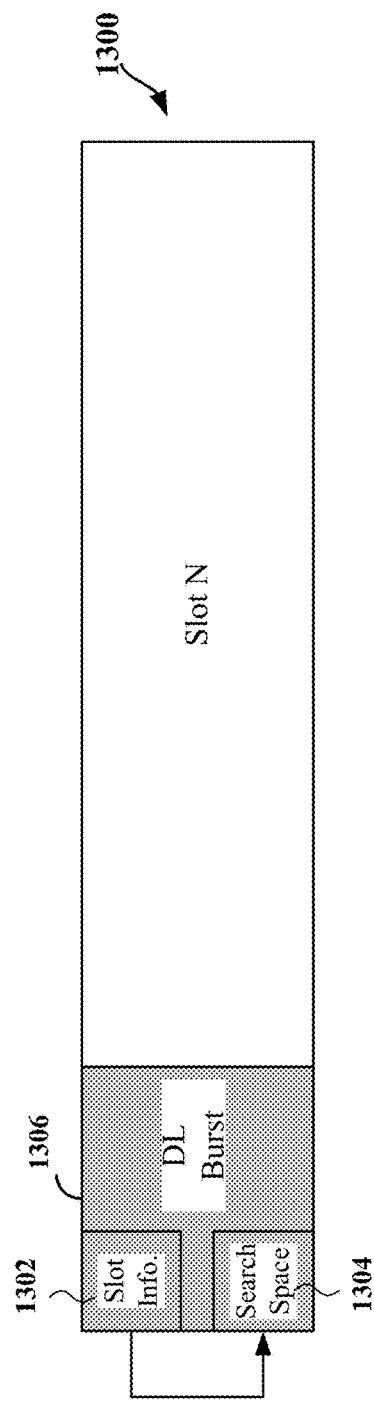
FIG. 13 is a diagram illustrating an example of a slot containing slot information and an optimized search space according to some aspects of the disclosure.

FIG. 13 is a diagram illustrating an example of a slot 1300 containing slot information 1302 and an optimized search space 1304 according to some aspects of the disclosure. The slot 1300 may be an uplink-centric slot or a downlink-centric slot and may be received by a scheduled entity, for example, as a current slot (e.g., Slot N) within a plurality of slots. The slot 1300 (e.g., either an uplink-centric slot or a downlink-centric slot) may further include a DL burst 1306 carrying downlink control information.

In the example shown in FIG. 13, the DL burst 1306 includes the slot information 1302 that indicates one or more attributes of the slot 1300. Examples of attributes within the slot information 1302 may include, but are not limited to, the type of slot (e.g., uplink-centric or downlink-centric), the type of user data traffic transmitted in the slot, the number of scheduled entities served in the slot (e.g., the number of scheduled entities transmitting/receiving user data traffic in the slot), the number of mini-slots included within the slot, user-specific slot attributes, and/or a slot index identifying the slot.

The slot information 1302 may be carried within, for example, an overhead channel transmitted within the slot 1300, such as the PCFICH. The slot information 1302 may then be utilized to identify one or more search spaces 1304 within the first N symbols (e.g., within the DL burst 1306) of the slot 1300. Each search space corresponds to a set of resource elements (e.g., contiguous CCEs) that includes a plurality of decoding candidates. The identified search space(s) 1304 may be common search spaces and/or UE-specific search spaces.

Figure 14:
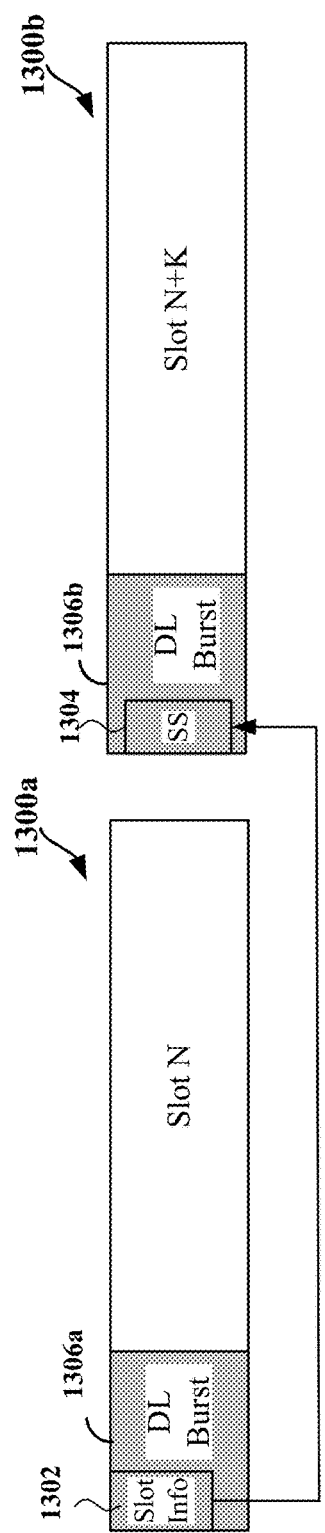
FIG. 14 is a diagram illustrating an example of slots containing slot information and an optimized search space according to some aspects of the disclosure.

FIG. 14 is a diagram illustrating an example of slots 1300a and 1300b containing slot information 1302 and an optimized search space 1304 according to some aspects of the disclosure. Each of the slots 1300a and 1300b may be either an uplink-centric slot or a downlink-centric slot. In addition, each of the slots 1300a and 1300b may be received by a scheduled entity, where slot 1300a is received prior to slot 1300b. For example, slot 1300a may correspond Slot N and slot 1300b may correspond to Slot N+K, where K≥1. Thus, slot 1300b may be received K slots after Slot N. Each of the slots 1300a and 1300b (e.g., either an uplink-centric slot or a downlink-centric slot) may further include a respective DL burst 1306a and 1306b carrying downlink control information.

In the example shown in FIG. 14, the DL burst 1306a of slot 1300a (Slot N) includes the slot information 1302 that indicates one or more attributes of slot 1300b (Slot N+K). Examples of attributes within the slot information 1302 may include, but are not limited to, the type of slot (e.g., uplink-centric or downlink-centric), the type of user data traffic transmitted in the slot, the number of scheduled entities served in the slot (e.g., the number of scheduled entities transmitting/receiving user data traffic in the slot), the number of mini-slots included within the slot, user-specific slot attributes, and/or a slot index identifying the slot.

The slot information 1302 may be carried within, for example, the PDCCH (e.g., DCI) or other control signal within the DL burst 1306a of slot 1300a. The slot information 1302 may then be utilized to identify one or more search spaces 1304 within the first N symbols (e.g., within the DL burst 1306b) of slot 1300b (Slot N+K). Each search space corresponds to a set of resource elements (e.g., contiguous CCEs) that includes a plurality of decoding candidates. The identified search space(s) 1304 may be common search spaces and/or UE-specific search spaces.

Figure 15:
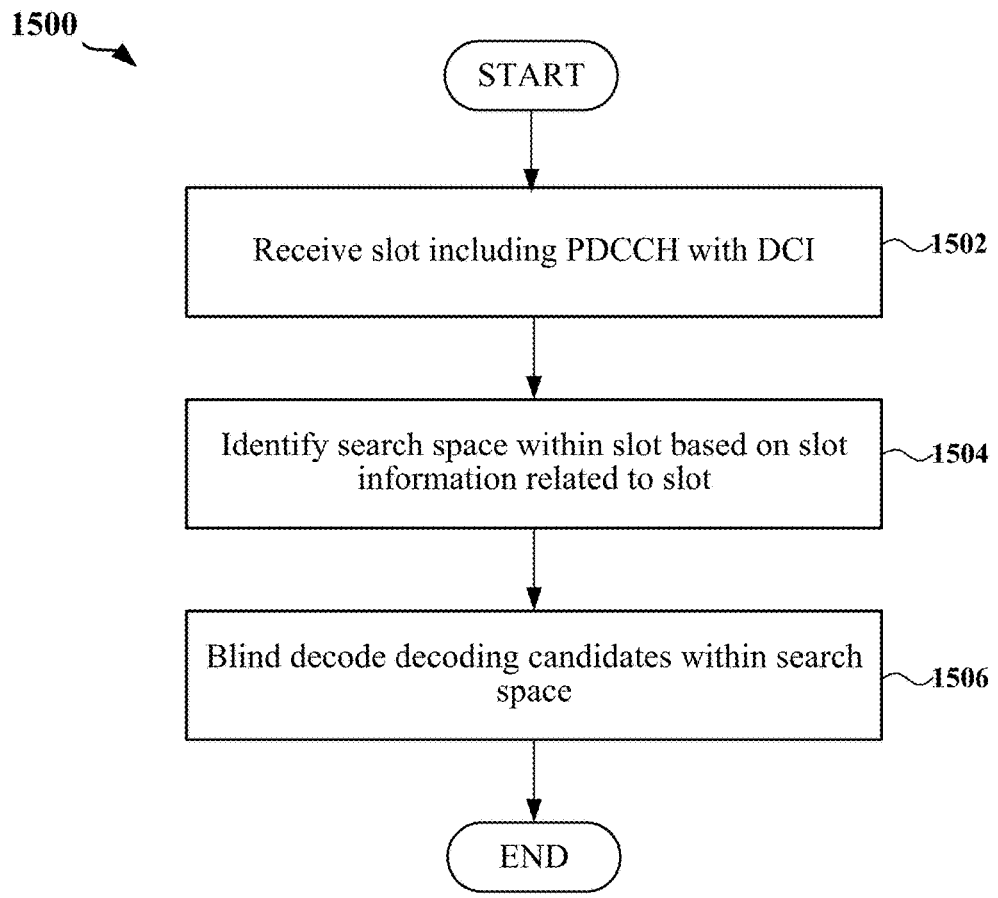
FIG. 15 is a flow chart illustrating an exemplary process for wireless communication with optimized search spaces in slots according to some aspects of the disclosure.

FIG. 15 is a flow chart illustrating a process 1500 for wireless communication with optimized search spaces in slots according to an aspect of the disclosure. As described below, some or all illustrated features may be omitted in a particular implementation within the scope of the present disclosure, and some illustrated features may not be required for implementation of all embodiments. In some examples, the process 1500 may be carried out by the scheduled entity illustrated in FIG. 7. In some examples, the process 1500 may be carried out by any suitable apparatus or means for carrying out the functions or algorithm described below.

At block 1502, the scheduled entity may receive a slot including a physical downlink control channel containing downlink control information (DCI). For example, the DL traffic and control channel reception and processing circuitry 742 shown and described above in connection with FIG. 7 may receive the slot.

At block 1504, the scheduled entity may identify one or more search spaces within the slot (e.g., within a downlink control region of the slot) based on slot information related to the slot. For example, the slot information may indicate one or more attributes of the slot, including, but not limited to, the type of slot (e.g., uplink-centric or downlink-centric), the type of user data traffic transmitted in the slot, the number of scheduled entities served in the slot (e.g., the number of scheduled entities transmitting/receiving user data traffic in the slot), the number of mini-slots included within the slot, user-specific slot attributes, and/or a slot index identifying the slot. The slot information may be known (e.g., the slot index may be known), may be received within the current slot (e.g., within an overhead channel, such as the PCFICH), or may be received within a previous slot.

In some examples, the scheduled entity may compare the slot information for the slot to search space information, which may indicate respective search spaces and corresponding slot information for each of the respective search spaces. In some examples, the scheduled entity may receive the search space information within one or more broadcast signals. For example, the search space information may be received within one or more MIBs, SIBs, and/or RRC configuration messages. The scheduled entity may compare the slot information of the current slot with the search space information to identify the particular search space(s) within the current slot. The identified search space(s) may be common search spaces and/or UE-specific search spaces. In addition, the starting point (or offset) within the control region of the slot for each search space may be specific to the scheduled entity. For example, the DL traffic and control channel reception and processing circuitry 742 shown and described above in connection with FIG. 7 may identify search space(s) within the slot based on the slot information.

Each search space corresponds to a set of resource elements (e.g., contiguous CCEs) that includes a plurality of decoding candidates. For each identified search space, at block 1506, the scheduled entity may further be configured to blind decode decoding candidates within the search space to determine whether at least one valid DCI exists for the scheduled entity within the search space. For example, for each decoding candidate, the scheduled entity may check whether the CRC was successfully decoded with the appropriate UE ID (e.g., the ID specific to the scheduled entity r a group ID associated with the scheduled entity), and if so, determine that the decoding candidate represents a valid DCI (e.g., contains a PDCCH with DCI for that scheduled entity). For example, the DL traffic and control channel reception and processing circuitry 742 shown and described above in connection with FIG. 7 may perform blind decoding of the decoding candidates within each identified search space.

Figure 16:
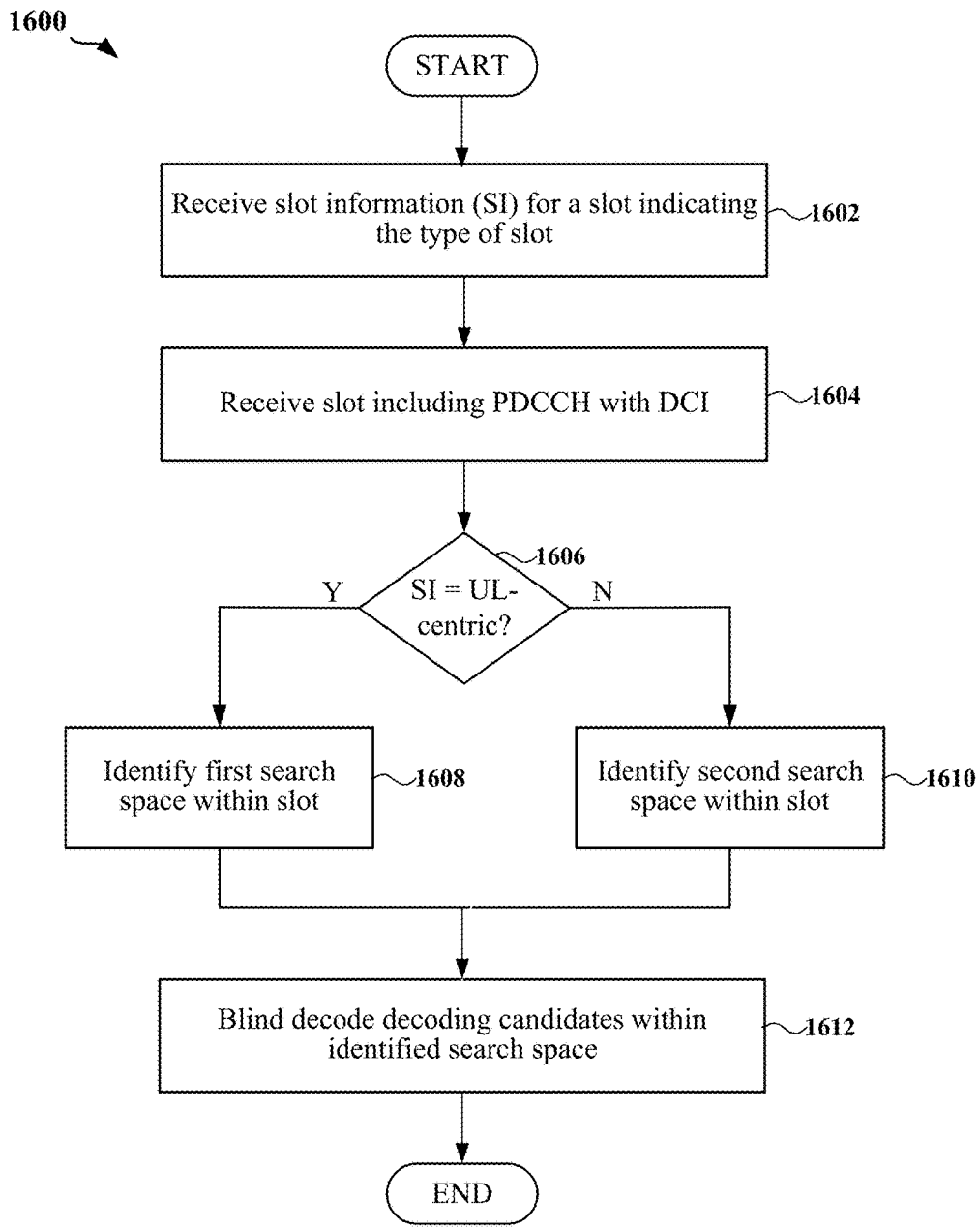
FIG. 16 is a flow chart illustrating another exemplary process for wireless communication with optimized search spaces in slots according to some aspects of the disclosure.

FIG. 16 is a flow chart illustrating a process 1600 for wireless communication with optimized search spaces in slots according to an aspect of the disclosure. As described below, some or all illustrated features may be omitted in a particular implementation within the scope of the present disclosure, and some illustrated features may not be required for implementation of all embodiments. In some examples, the process 1600 may be carried out by the scheduled entity illustrated in FIG. 7. In some examples, the process 1600 may be carried out by any suitable apparatus or means for carrying out the functions or algorithm described below.

At block 1602, the scheduled entity may receive slot information related to a slot. The slot information may indicate the type of slot (e.g., uplink-centric or downlink-centric). The slot information may be received within the slot itself or within a previous slot. For example, the DL traffic and control channel reception and processing circuitry 742 shown and described above in connection with FIG. 7 may receive the slot information.

At block 1604, the scheduled entity may receive the slot (e.g., a downlink-centric slot or an uplink-centric slot) including a physical downlink control channel (PDCCH) containing downlink control information (DCI). For example, the DL traffic and control channel reception and processing circuitry 742 shown and described above in connection with FIG. 7 may receive the slot.

At block 1606, the scheduled entity may determine whether the slot information indicates that the slot is an uplink-centric slot. If the slot is an uplink-centric slot (Y branch of block 1606), at block 1608, the scheduled entity may identify a first search space including a first set of resource elements (e.g., within a downlink control region of the slot) for the uplink-centric slot. If the slot is a downlink-centric slot (N branch of block 1606), at block 1610, the scheduled entity may identify a second search space including a second set of resource elements (e.g., within a downlink control region of the slot) for the downlink-centric slot. In some examples, the scheduled entity may compare the slot information for the slot to search space information, which may indicate respective search spaces for uplink-centric slots and downlink-centric slots. In some examples, the first and second search spaces may be different. For example, the DL traffic and control channel reception and processing circuitry 742 shown and described above in connection with FIG. 7 may identify search space(s) within the slot based on the slot information.

At block 1612, the scheduled entity may further be configured to blind decode decoding candidates within the identified search space (e.g., the first search space or the second search space) to determine whether at least one valid DCI exists for the scheduled entity within the identified search space. For example, for each decoding candidate, the scheduled entity may check whether the CRC was successfully decoded with the appropriate UE ID (e.g., the ID specific to the scheduled entity r a group ID associated with the scheduled entity), and if so, determine that the decoding candidate represents a valid DCI (e.g., contains a PDCCH with DCI for that scheduled entity). For example, the DL traffic and control channel reception and processing circuitry 742 shown and described above in connection with FIG. 7 may perform blind decoding of the decoding candidates within the identified search space(s).

Figure 17:
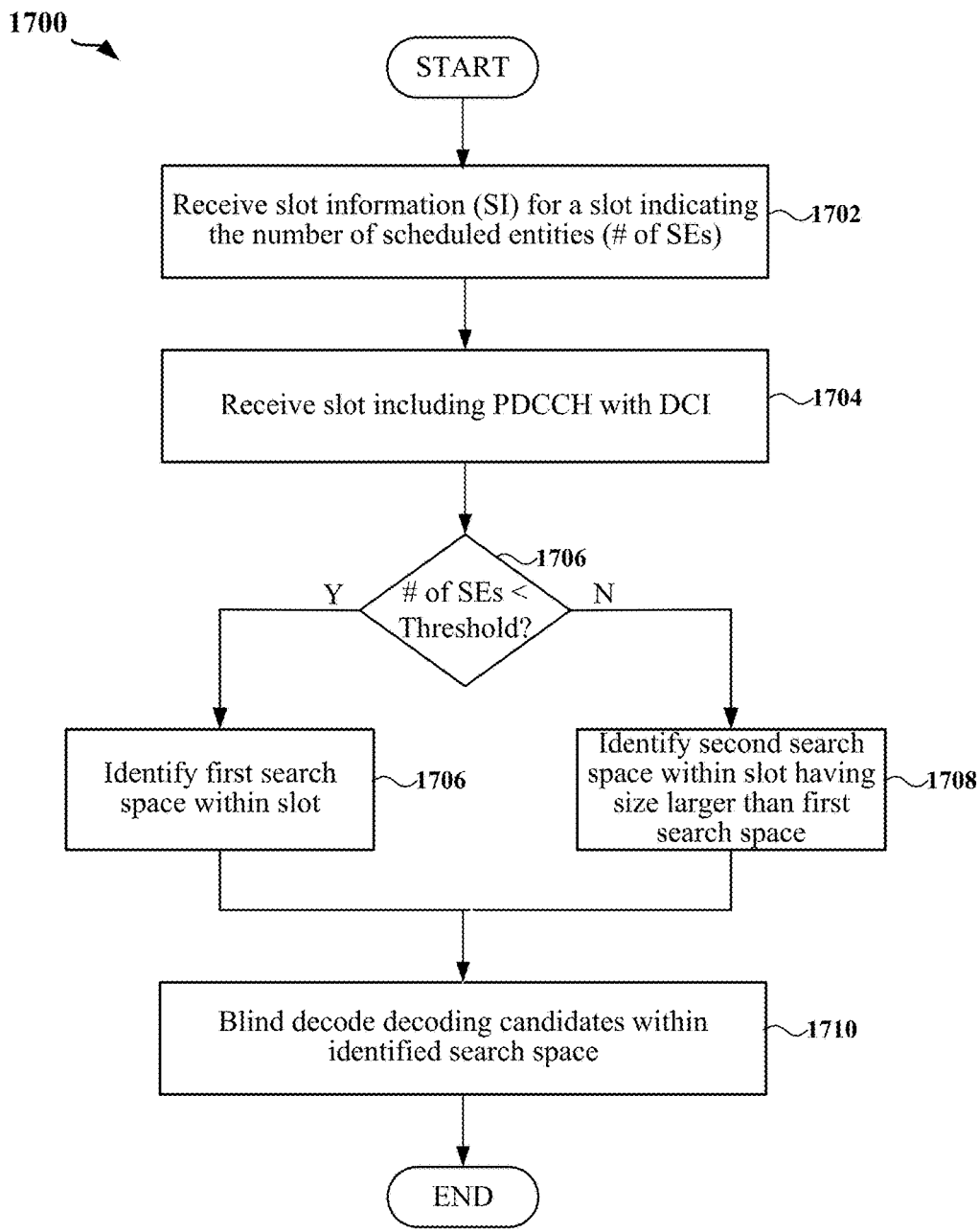
FIG. 17 is a flow chart illustrating another exemplary process for wireless communication with optimized search spaces in slots according to some aspects of the disclosure.

FIG. 17 is a flow chart illustrating a process 1700 for wireless communication with optimized search spaces in slots according to an aspect of the disclosure. As described below, some or all illustrated features may be omitted in a particular implementation within the scope of the present disclosure, and some illustrated features may not be required for implementation of all embodiments. In some examples, the process 1700 may be carried out by the scheduled entity illustrated in FIG. 7. In some examples, the process 1700 may be carried out by any suitable apparatus or means for carrying out the functions or algorithm described below.

At block 1702, the scheduled entity may receive slot information related to a slot. The slot information may indicate the number of scheduled entities served in the slot (e.g., the number of scheduled entities transmitting/receiving user data traffic in the slot). In some examples, the slot information may be received within the slot itself. For example, the DL traffic and control channel reception and processing circuitry 742 shown and described above in connection with FIG. 7 may receive the slot information.

At block 1704, the scheduled entity may receive the slot (e.g., a downlink-centric slot or an uplink-centric slot) including a physical downlink control channel (PDCCH) containing downlink control information (DCI). For example, the DL traffic and control channel reception and processing circuitry 742 shown and described above in connection with FIG. 7 may receive the slot.

At block 1706, the scheduled entity may determine whether the number of scheduled entities is less than a threshold number of scheduled entities. If the number of scheduled entities is less than (or less than or equal to) the threshold (Y branch of block 1706), at block 1708, the scheduled entity may identify a first search space including a first set of resource elements (e.g., within a downlink control region of the slot). If the number of scheduled entities is greater than (or greater than or equal to) the threshold (N branch of block 1706), at block 1710, the scheduled entity may identify a second search space including a second set of resource elements (e.g., within a downlink control region of the slot). In some examples, the scheduled entity may compare the slot information for the slot to search space information, which may indicate respective search spaces based on the number of scheduled entities. In some examples, the second search space size is larger than the first search space size to accommodate the number of DCI needed to be transmitted in the slot. For example, the DL traffic and control channel reception and processing circuitry 742 shown and described above in connection with FIG. 7 may identify search space(s) within the slot based on the slot information.

At block 1712, the scheduled entity may further be configured to blind decode decoding candidates within the identified search space (e.g., the first search space or the second search space) to determine whether at least one valid DCI exists for the scheduled entity within the identified search space. For example, for each decoding candidate, the scheduled entity may check whether the CRC was successfully decoded with the appropriate UE ID (e.g., the ID specific to the scheduled entity r a group ID associated with the scheduled entity), and if so, determine that the decoding candidate represents a valid DCI (e.g., contains a PDCCH with DCI for that scheduled entity). For example, the DL traffic and control channel reception and processing circuitry 742 shown and described above in connection with FIG. 7 may perform blind decoding of the decoding candidates within the identified search space(s).

Figure 18:
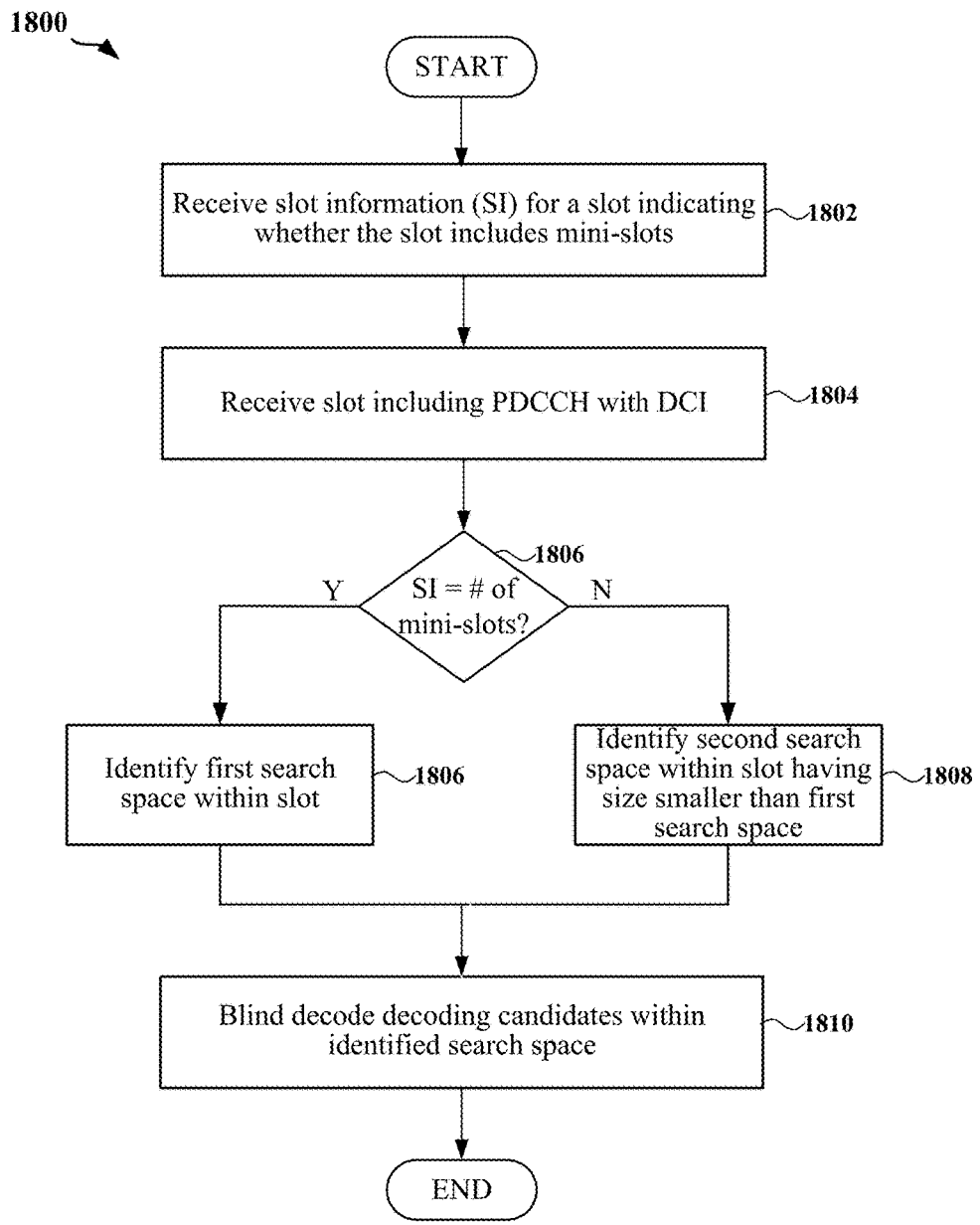
FIG. 18 is a flow chart illustrating an exemplary process for wireless communication with optimized search spaces in slots according to some aspects of the disclosure.

FIG. 18 is a flow chart illustrating a process 1800 for wireless communication with optimized search spaces in slots according to an aspect of the disclosure. As described below, some or all illustrated features may be omitted in a particular implementation within the scope of the present disclosure, and some illustrated features may not be required for implementation of all embodiments. In some examples, the process 1800 may be carried out by the scheduled entity illustrated in FIG. 7. In some examples, the process 1800 may be carried out by any suitable apparatus or means for carrying out the functions or algorithm described below.

At block 1802, the scheduled entity may receive slot information related to a slot. The slot information may indicate whether the slot includes mini-slots, and if so, the number of mini-slots in the slot. In some examples, the slot information may be received within the slot itself. For example, the DL traffic and control channel reception and processing circuitry 742 shown and described above in connection with FIG. 7 may receive the slot information.

At block 1804, the scheduled entity may receive the slot (e.g., a downlink-centric slot or an uplink-centric slot) including a physical downlink control channel (PDCCH) containing downlink control information (DCI). For example, the DL traffic and control channel reception and processing circuitry 742 shown and described above in connection with FIG. 7 may receive the slot.

At block 1806, the scheduled entity may determine whether the slot includes mini-slots (e.g., two or more mini-slots). If the slot includes mini-slots (Y branch of block 1806), at block 1808, the scheduled entity may identify a first search space including a first set of resource elements (e.g., within a downlink control region of the slot). If the slot lacks mini-slots (N branch of block 1806), at block 1810, the scheduled entity may identify a second search space including a second set of resource elements (e.g., within a downlink control region of the slot). In some examples, the scheduled entity may compare the slot information for the slot to search space information, which may indicate respective search spaces based on whether the slot includes mini-slots. In some examples, the size of the first search space is larger than the second search space since each of the mini-slots may require separate scheduling, thus increasing the amount of PDCCH resources needed in the slot. In addition, the first search space size may vary based on the number of mini-slots included within the slot. For example, the DL traffic and control channel reception and processing circuitry 742 shown and described above in connection with FIG. 7 may identify search space(s) within the slot based on the slot information.

At block 1812, the scheduled entity may further be configured to blind decode decoding candidates within the identified search space (e.g., the first search space or the second search space) to determine whether at least one valid DCI exists for the scheduled entity within the identified search space. For example, for each decoding candidate, the scheduled entity may check whether the CRC was successfully decoded with the appropriate UE ID (e.g., the ID specific to the scheduled entity r a group ID associated with the scheduled entity), and if so, determine that the decoding candidate represents a valid DCI (e.g., contains a PDCCH with DCI for that scheduled entity). For example, the DL traffic and control channel reception and processing circuitry 742 shown and described above in connection with FIG. 7 may perform blind decoding of the decoding candidates within the identified search space(s).

In one configuration, a scheduled entity apparatus within a wireless communication network includes means for receiving a slot of the plurality of slots, where the slot includes a physical downlink control channel (PDCCH), and the PDCCH includes downlink control information (DCI) for a set of one or more scheduled entities. The scheduled entity apparatus further includes means for identifying a search space including a set of resource elements within the slot based on slot information related to the slot, where the slot information indicates at least one attribute of the slot, and the at least one attribute of the slot includes at least one of a slot type of the slot, a number of scheduled entities scheduled in the slot, or a slot index of the slot. The scheduled entity apparatus further includes means for blind decoding a plurality of decoding candidates within the set of resource elements to determine whether at least one valid DCI exists for a scheduled entity of the set of one or more scheduled entities.

In one aspect, the aforementioned means for receiving the slot, identifying the search space including the set of resource elements within the slot, and blind decoding the plurality of decoding candidates within the set of resource elements may be the transceiver 710 and the processor(s) 704 shown in FIG. 7. For example, the aforementioned means may include the transceiver 710 and the DL traffic and control channel reception and processing circuitry 742 shown in FIG. 7. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6 and/or 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication in a cell utilizing a time division duplex (TDD) carrier, wherein the TDD carrier comprises a plurality of slots, the method comprising:
   receiving downlink control information in a downlink control region of a slot of the plurality of slots;
   transmitting uplink information in an uplink region of the slot, wherein the uplink information comprises at least one of uplink control information or uplink user data traffic corresponding to the downlink control information; and
   transmitting a sounding reference signal in the uplink region of the slot;
   wherein the sounding reference signal is transmitted prior to transmitting the uplink information or after transmitting the uplink information.

2. The method of claim 1, further comprising:
   transmitting an uplink demodulation reference signal in the uplink region of the slot;
   wherein the uplink demodulation reference signal is transmitted prior to transmitting the uplink information.

3. The method of claim 2, wherein transmitting the uplink demodulation reference signal further comprises:
   transmitting the uplink demodulation reference signal prior to transmitting the sounding reference signal.

4. The method of claim 3, wherein transmitting the sounding reference signal further comprises:
   transmitting the sounding reference signal prior to transmitting the uplink information.

5. The method of claim 3, wherein transmitting the sounding reference signal further comprises:
   transmitting the sounding reference signal after transmitting the uplink information.

6. The method of claim 2, further comprising:
   aligning the uplink demodulation reference signal of the slot with a downlink demodulation reference signal of an additional slot transmitted within an adjacent cell.

7. The method of claim 2, wherein transmitting the uplink demodulation reference signal further comprises:
   transmitting the uplink demodulation reference signal after transmitting the sounding reference signal.

8. The method of claim 1, further comprising:
   receiving sounding reference signal information indicating a location of the sounding reference signal in the slot.

9. The method of claim 8, wherein receiving the sounding reference signal information further comprises:
receiving the sounding reference signal information within the downlink control information in the downlink control region of one or more slots of the plurality of slots.

10. The method of claim 8, wherein receiving the sounding reference signal information further comprises:
receiving the sounding reference signal information via one or more of a radio resource control configuration message, a master information block, or a system information block.

11. A scheduled entity within a wireless communication network, comprising:
a processor;
a memory communicatively coupled to the processor; and
a transceiver communicatively coupled to the processor, wherein the processor is configured to:
receive downlink control information in a downlink control region of a slot of a plurality of slots of a time division duplex (TDD) carrier;
transmit uplink control information and uplink user data traffic corresponding to the downlink control information in an uplink region of the slot; and
transmit a sounding reference signal in the uplink region of the slot;
wherein the sounding reference signal is transmitted prior to transmitting both the uplink user data traffic and the uplink control information or after transmitting both the uplink user data traffic and the uplink control information.

12. The scheduled entity of claim 11, wherein the processor is further configured to:
transmit an uplink demodulation reference signal in the uplink region of the slot prior to transmitting the sounding reference signal or after transmitting the sounding reference signal;
wherein the uplink demodulation reference signal is transmitted prior to transmitting the uplink information.

13. The scheduled entity of claim 12, wherein the processor is further configured to:
align the uplink demodulation reference signal of the slot with a downlink demodulation reference signal of an additional slot transmitted within an adjacent cell.

14. The scheduled entity of claim 11, further comprising:
receiving sounding reference signal information indicating a location of the sounding reference signal in the slot.

15. A method of wireless communication in a cell utilizing a time division duplex (TDD) carrier, wherein the TDD carrier comprises a plurality of slots, the method comprising:
receiving a slot of the plurality of slots, wherein the slot comprises a physical downlink control channel (PDCCH), wherein the PDCCH comprises downlink control information (DCI) for a set of one or more scheduled entities;
identifying a search space comprising a set of resource elements within the slot based on slot information related to the slot, wherein the slot information indicates at least one attribute of the slot, wherein the at least one attribute of the slot comprises at least one of a slot type of the slot, a number of scheduled entities scheduled in the slot, or a slot index of the slot; and
blind decoding a plurality of decoding candidates within the set of resource elements to determine whether at least one valid DCI exists for a scheduled entity of the set of one or more scheduled entities.

16. The method of claim 15, further comprising:
receiving search space information indicating respective search spaces and corresponding slot information for each of the respective search spaces.

17. The method of claim 15, wherein identifying the search space further comprises:
identifying a first search space comprising a first set of resource elements when the slot information indicates the slot comprises an uplink-centric slot; and
identifying a second search space comprising a second set of resource elements when the slot information indicates the slot comprises a downlink-centric slot.

18. The method of claim 17, wherein the first search space is different than the second search space.

19. The method of claim 17, further comprising:
receiving the slot information within a previous slot of the plurality of slots.

20. The method of claim 15, wherein identifying the search space further comprises:
identifying a first search space comprising a first set of resource elements, the first search space corresponding to a first attribute of the slot;
identifying a second search space comprising a second set of resource elements, wherein the second search space is within the first search space and the first set of resource elements comprises the second set of resource elements, the second search space corresponding to a second attribute of the slot; and
blind decoding the plurality of decoding candidates within the first set of resource elements when the slot information fails to indicate either the first attribute or the second attribute.

21. The method of claim 15, wherein the slot information indicates the number of scheduled entities scheduled in the slot, and wherein identifying the search space further comprises:
identifying a first search space comprising a first set of resource elements when the number of scheduled entities is less than a threshold number of scheduled entities; and
identifying a second search space comprising a second set of resource elements when the number of scheduled entities is greater than the threshold number of scheduled entities;
wherein the first search space is smaller than the second search space.

22. The method of claim 15, wherein identifying the search space further comprises:
identifying a first search space comprising a first set of resource elements when the slot information indicates the slot comprises two or more mini-slots; and
identifying a second search space comprising a second set of resource elements when the slot information indicates the slot lacks mini-slots;
wherein the first search space is larger than the second search space.

23. The method of claim 15, wherein the at least one attribute of the slot comprises a user specific slot attribute specific to the scheduled entity, and wherein identifying the search space further comprises:
identifying the search space within the slot further based on the user specific slot attribute.

24. The method of claim 15, further comprising:
inhibiting blind decoding of the set of resource elements when the search space is empty.

25. The method of claim 15, wherein the search space comprises one or more of a common search space or a user specific search space.

26. A scheduled entity within a wireless communication network, comprising:
- a processor;
- a memory communicatively coupled to the processor; and
- a transceiver communicatively coupled to the processor, wherein the processor is configured to:
  - receive a slot of a plurality of slots of a time division duplex (TDD) carrier, the slot comprising a physical downlink control channel (PDCCH), wherein the PDCCH comprises downlink control information (DCI) for a set of one or more scheduled entities;
  - identify a search space comprising a set of resource elements within the slot based on slot information related to the slot, wherein the slot information indicates at least one attribute of the slot, wherein the at least one attribute of the slot comprises at least one of a slot type of the slot, a number of scheduled entities scheduled in the slot, or a slot index of the slot; and
  - blind decode a plurality of decoding candidates within the set of resource elements to determine whether at least one valid DCI exists for a scheduled entity of the set of one or more scheduled entities.

27. The scheduled entity of claim 26, wherein the processor is further configured to:
- identify a first search space comprising a first set of resource elements when the slot information indicates the slot comprises an uplink-centric slot; and
- identifying a second search space comprising a second set of resource elements when the slot information indicates the slot comprises a downlink-centric slot;

wherein the first search space is different than the second search space.

28. The scheduled entity of claim 26, wherein the slot information indicates the number of scheduled entities scheduled in the slot, and wherein the processor is further configured to:
- identify a first search space comprising a first set of resource elements when the number of scheduled entities is less than a threshold number of scheduled entities; and
- identify a second search space comprising a second set of resource elements when the number of scheduled entities is greater than the threshold number of scheduled entities;

wherein the first search space is smaller than the second search space.

29. The scheduled entity of claim 26, wherein the processor is further configured to:
- identify a first search space comprising a first set of resource elements when the slot information indicates the slot comprises two or more mini-slots; and
- identify a second search space comprising a second set of resource elements when the slot information indicates the slot lacks mini-slots;

wherein the first search space is larger than the second search space.

30. The scheduled entity of claim 26, wherein the processor is further configured to:
- inhibit blind decoding of the set of resource elements when the search space is empty.

* * * * *